United States Patent
Yamakaji et al.

(10) Patent No.: US 9,242,889 B2
(45) Date of Patent: Jan. 26, 2016

(54) METHOD OF MANUFACTURING FORMED ARTICLE, GLASS MATERIAL, AND METHOD OF DETERMINING SHAPE OF GLASS MATERIAL AND MOLD

(75) Inventors: Tetsuma Yamakaji, Shinjuku-ku (JP); Mikio Chisha, Shinjuku-ku (JP); Masaaki Matsushima, Shinjuku-ku (JP); Noriaki Taguchi, Shinjuku-ku (JP)

(73) Assignee: HOYA CORPORATION, Tokyo (JP)

( * ) Notice: Subject to any disclaimer, the term of this patent is extended or adjusted under 35 U.S.C. 154(b) by 897 days.

(21) Appl. No.: 11/916,402

(22) PCT Filed: Nov. 20, 2006

(86) PCT No.: PCT/JP2006/323137
§ 371 (c)(1),
(2), (4) Date: Dec. 8, 2008

(87) PCT Pub. No.: WO2007/058353
PCT Pub. Date: May 24, 2007

(65) Prior Publication Data
US 2009/0108477 A1   Apr. 30, 2009

(30) Foreign Application Priority Data

| Nov. 18, 2005 | (JP) | ................................. 2005-334187 |
| Nov. 30, 2005 | (JP) | ................................. 2005-345459 |
| Nov. 30, 2005 | (JP) | ................................. 2005-346162 |
| Feb. 28, 2006 | (JP) | ................................. 2006-053196 |

(51) Int. Cl.
*B29D 11/00*   (2006.01)
*C03B 23/035*   (2006.01)
(Continued)

(52) U.S. Cl.
CPC ......... *C03B 23/0357* (2013.01); *C03B 23/0258* (2013.01); *C03B 40/00* (2013.01); *C03B 40/005* (2013.01)

(58) Field of Classification Search
USPC ............ 264/1.1, 1.31, 1.32, 1.7, 1.8, 2.1, 2.2, 264/2.3, 2.7
See application file for complete search history.

(56) References Cited

U.S. PATENT DOCUMENTS

| 1,619,341 | A | * | 3/1927 | Gagnon | ............................. 65/61 |
| 2,015,007 | A | * | 9/1935 | Emerson | ............................ 65/37 |

(Continued)

FOREIGN PATENT DOCUMENTS

| CN | 1267034 A | 9/2000 |
| CN | 101158749 A | 4/2008 |

(Continued)

OTHER PUBLICATIONS

English translation of Written Opinion of International Searching Authority dated May 29, 2008.

(Continued)

*Primary Examiner* — Stella Yi
(74) *Attorney, Agent, or Firm* — Sughrue Mion, PLLC

(57) ABSTRACT

The present invention relates to a method of manufacturing a formed article comprising forming an upper surface of a glass material that has been positioned on a forming surface of a mold to obtain the formed article by heating the glass material to a temperature permitting deformation to bring a lower surface of the glass material into tight contact with the forming surface. Glass having upper and lower surfaces being spherical in shape is employed as the glass material, a mold having a forming surface being a free-form surface other than a spherical surface is employed as the mold, the upper surface of the glass material is formed into a roughly offset surface relative to the forming surface of the mold. The present invention permits the manufacturing of formed articles of desired shape with high precision by hot sag molding method. The present invention also permits the easy and simple determination of the surface shapes of molds and glass materials employed in hot sag molding method.

13 Claims, 11 Drawing Sheets

(51) Int. Cl.
*C03B 23/025* (2006.01)
*C03B 40/00* (2006.01)

(56) References Cited

U.S. PATENT DOCUMENTS

| | | | |
|---|---|---|---|
| 2,996,421 A | 12/1960 | Zimmerman et al. | |
| 3,607,186 A | 9/1971 | Bognar | |
| 3,623,800 A | 11/1971 | Wolk | |
| 4,018,587 A * | 4/1977 | Maitenaz | 264/2.7 |
| 4,105,429 A | 8/1978 | Delgado | |
| 4,115,090 A | 9/1978 | Comperatore | |
| 4,119,424 A | 10/1978 | Comperatore | |
| 4,349,374 A | 9/1982 | Rupp | |
| 4,589,901 A | 5/1986 | Yoshizawa et al. | |
| 4,859,225 A | 8/1989 | Kuster et al. | |
| 4,883,524 A | 11/1989 | Bristol | |
| 5,147,437 A | 9/1992 | Bristol | |
| 5,340,375 A | 8/1994 | Anttonen | |
| 5,437,704 A | 8/1995 | Yli-Vakkuri et al. | |
| 5,589,024 A * | 12/1996 | Blake | 156/245 |
| 5,662,999 A | 9/1997 | Taniguchi et al. | |
| 5,766,542 A | 6/1998 | Berrun-Castanon et al. | |
| 6,240,746 B1 | 6/2001 | Maeda et al. | |
| 6,363,747 B1 | 4/2002 | Budinski et al. | |
| 6,623,269 B2 | 9/2003 | Tsutsui et al. | |
| 6,629,436 B1 | 10/2003 | Skeen et al. | |
| 6,740,366 B2 | 5/2004 | Hori et al. | |
| 7,008,058 B2 | 3/2006 | Haimerl et al. | |
| 7,950,252 B2 | 5/2011 | Chisha et al. | |
| 2002/0078713 A1 | 6/2002 | Matsumoto et al. | |
| 2003/0094017 A1 | 5/2003 | Matsuo et al. | |
| 2003/0147325 A1 | 8/2003 | Wilkinson et al. | |
| 2004/0000168 A1* | 1/2004 | Vandal | 65/106 |
| 2004/0036974 A1* | 2/2004 | Iizuka et al. | 359/581 |
| 2004/0107731 A1 | 6/2004 | Doehring et al. | |
| 2005/0093210 A1 | 5/2005 | Umetani | |
| 2005/0110945 A1 | 5/2005 | Haimerl et al. | |
| 2008/0049287 A1 | 2/2008 | Kimura et al. | |
| 2008/0099935 A1* | 5/2008 | Egle et al. | 264/1.7 |
| 2008/0134721 A1 | 6/2008 | Maeda | |
| 2009/0108477 A1 | 4/2009 | Yamakaji et al. | |
| 2009/0127727 A1 | 5/2009 | Matsushima et al. | |
| 2009/0289380 A1 | 11/2009 | Chisha et al. | |
| 2011/0127685 A1 | 6/2011 | Taguchi et al. | |
| 2011/0133352 A1 | 6/2011 | Taguchi et al. | |
| 2011/0163466 A1 | 7/2011 | Taguchi et al. | |
| 2011/0304064 A1 | 12/2011 | Taguchi et al. | |

FOREIGN PATENT DOCUMENTS

| | | | |
|---|---|---|---|
| EP | 0 154 382 A2 | 9/1985 | |
| EP | 1 391 433 A2 | 5/2004 | |
| EP | 1 736 973 A2 | 12/2006 | |
| EP | 1 961 709 A1 | 8/2008 | |
| EP | 1 967 498 A1 | 9/2008 | |
| EP | 2 248 646 A1 | 11/2010 | |
| EP | 2 298 706 A1 | 3/2011 | |
| FR | 2 109 010 A1 | 5/1972 | |
| JP | 55007507 A | 1/1980 | |
| JP | 61-048801 A | 3/1986 | |
| JP | 63-306390 A | 12/1988 | |
| JP | 01-171932 A | 7/1989 | |
| JP | H04-187533 A | 7/1992 | |
| JP | 04-275930 A | 10/1992 | |
| JP | 06-130333 A | 5/1994 | |
| JP | 07-300328 A | 11/1995 | |
| JP | 9-124339 A | 5/1997 | |
| JP | 10-025123 A | 1/1998 | |
| JP | 10-078567 A | 3/1998 | |
| JP | H10-194763 A | 7/1998 | |
| JP | 10-291828 A | 11/1998 | |
| JP | H11-49528 A | 2/1999 | |
| JP | 11-116257 A | 4/1999 | |
| JP | 2000-229319 A | 8/2000 | |
| JP | 2000-302473 A | 10/2000 | |
| JP | 2000-327344 A | 11/2000 | |
| JP | 2001-322830 A | 11/2001 | |
| JP | 2001-335334 A | 12/2001 | |
| JP | 2002-003225 A | 1/2002 | |
| JP | 2002-081870 A | 3/2002 | |
| JP | 2003-232902 A | 8/2003 | |
| JP | 2004-002191 A | 1/2004 | |
| JP | 2005-132679 A | 5/2005 | |
| JP | 2005-350286 A | 12/2005 | |
| JP | 2008-221720 A | 9/2008 | |
| KR | 2002-0060445 A | 7/2002 | |
| RU | 2 087 430 C1 | 8/1997 | |
| RU | 2245852 C1 | 2/2005 | |
| SU | 121992 A1 | 2/1986 | |
| SU | 1426954 A2 | 9/1988 | |
| WO | 95-23769 A1 | 9/1995 | |
| WO | 03/079095 A2 | 9/2003 | |
| WO | 2005-108317 A1 | 11/2005 | |
| WO | 2006/095007 A1 | 9/2006 | |
| WO | 2007/058353 A1 | 5/2007 | |
| WO | 2007/063734 A1 | 6/2007 | |
| WO | 2007/063735 A1 | 6/2007 | |
| WO | 2009/096085 A1 | 8/2009 | |
| WO | 2009/144943 A1 | 12/2009 | |

OTHER PUBLICATIONS

Official Decision on Grant dated Sep. 7, 2010, issued in Russian counterpart application.
Chinese Office Action dated Jun. 30, 2011, issued in Chinese Patent Application No. 200680043172.0.
International Search Report for International Patent Application No. PCT/JP2006/323135, dated Jan. 9, 2007.
Official Decision on Grant dated Oct. 26, 2010, for Russian Patent Application No. 2008126286.
International Search Report for International Patent Application No. PCT/JP2010/001343 dated May 25, 2010.
Written Opinion of International Patent Application No. PCT/JP2010/001343, dated May 10, 2010.
International Preliminary Report on Patentability of Chapter I for International Patent Application No. PCT/JP2009/002361, dated Jan. 20, 2011.
International Search Report for International Patent Application No. PCT/JP2009/002361, dated Jul. 14, 2009.
Written Opinion of the ISA for International Patent Application No. PCT/JP2009/002361, dated Jul. 14, 2009.
International Search Report for International Patent Application No. PCT/JP2010/001344, dated May 25, 2010.
Written Opinion of International Patent Application No. PCT/JP2010/001344, (Form PCT/ISA/237), dated May 25, 2010.
International Search Report for International Patent Application No. PCT/JP2008/071352, dated Feb. 17, 2009.
Official Decision on Grant dated Sep. 10, 2010, for Russian Patent Application No. 2008124837.
International Search Report for International Patent Application No. PCT/JP2006/323134, dated Jan. 9, 2007.
International Search Report for International Patent Application No. PCT/JP2006/323137, dated Jan. 9, 2007.
Office Action dated Aug. 16, 2010, issued in U.S. Appl. No. 12/095,648.
Office Action dated Aug. 6, 2010, issued in U.S. Appl. No. 12/095,258.
Office Action dated Feb. 10, 2011, issued in U.S. Appl. No. 12/095,258.
Office Action dated Mar. 28, 2011, issued in U.S. Appl. No. 11/916,402.
Office Action dated Dec. 12, 2011, issued in U.S. Appl. No. 11/916,402.
Office Action dated Nov. 13, 2009, issued in U.S. Appl. No. 12/094,059.
Office Action dated May 24, 2010, issued in U.S. Appl. No. 12/094,059.
Office Action dated Nov. 9, 2011, issued in U.S. Appl. No. 12/094,059.

(56) References Cited

OTHER PUBLICATIONS

International Preliminary Report on Patentability of Chapter I for International Patent Application No. PCT/JP2010/001343, dated Sep. 9, 2011.
International Preliminary Report on Patentability of Chapter I for International Patent Application No. PCT/JP2010/001343, dated Sep. 22, 2011.
International Preliminary Report on Patentability of Chapter I for International Patent Application No. PCT/JP2010/001344, dated Sep. 9, 2011.
International Preliminary Report on Patentability of Chapter I for International Patent Application No. PCT/JP2010/001344, dated Sep. 22, 2011.
Fine Ceramics World page on the web, per Kyocera Corporation, as a PDF (Ceramic pdf).
Dement Abstract of JP 55007507.
Office Action issued by the Intellectual Property Office of the People's Republic of China in patent application No. 201080018054.0 on Sep. 29, 2013.
Office Action issued by the Intellectual Property Office of the People's Republic of China in patent application No. 201080018055.5 on Sep. 29, 2013.
Japanese Patent Office Action dated Jun. 26, 2012, issued in JP Application No. 2007-545335.
Japanese Patent Office Action dated Jun. 26, 2012, issued in JP Application No. 2007-547903.
Chinese Office Action issued in Chinese Patent Application No. 200680043172.0 dated Jun. 13, 2012.
Jimenez-Garate, et al.; "Thermal Forming of Glass Microsheets for X-Ray Telescope Mirror Segments", Applied Optics, Optical Society of America, Washington, D.C.; US, vol. 42, No. 4, Feb. 1, 2003; pp. 724-735, XP001159268.
Communication dated Sep. 1, 2014 by the European Patent Office in counterpart EP Application No. 06832987.9.
Communication dated Sep. 2, 2014 by the European Patent Office in counterpart European Patent Application No. 06832984.6.
Communication dated Sep. 1, 2014 by the European Patent Office in counterpart EP Application No. 06832985.3.
Communication dated Sep. 1, 2014 by the European Patent Office in counterpart EP Application No. 06832986.1.
Communication dated Sep. 1, 2014 by the European Patent Office in counterpart EP Application No. 08871636.0.
Communication dated Sep. 15, 2014 by the European Partent Office in counterpart EP Application No. 10746019.8.
Communication dated Sep. 15, 2014 by the European Patent Office in counterpart EP Application No. 10746020.6.
First Examination Report dated Jun. 12, 2014, and issued by the Indian Patent Office in Indian Application No. 3057/CHENP/2008.

* cited by examiner (a)

(b)

(a)

(b)

(a)

(b)

(c)

S degree distribution

C degree distribution

S degree distribution

C degree distribution (a)

(b)

(a)

(b)

METHOD OF MANUFACTURING FORMED ARTICLE, GLASS MATERIAL, AND METHOD OF DETERMINING SHAPE OF GLASS MATERIAL AND MOLD

CROSS REFERENCE TO RELATED APPLICATIONS

This application is a National Stage of International Application No. PCT/JP2006/323137 filed on Nov. 20, 2006, claiming priority based on Japanese Patent Application Nos. 2005-334187, 2005-345459, 2005-346162, and 2006-053196, filed Nov. 18, 2005, Nov. 30, 2005, Nov. 30, 2005, and Feb. 28, 2006, the contents of all of which are incorporated herein by reference in their entirety.

TECHNICAL FIELD

The present invention relates to a method of manufacturing a formed article by hot sag forming method, a glass material for use in hot sag forming method and a method of determining a shape of the lower surface thereof, and a method of determining a shape of a forming surface of a mold for use in hot sag forming method.

TECHNICAL BACKGROUND

Methods of forming glass molds for eyeglass lenses include employing mechanical grinding and polishing methods, mechanical grinding methods, and electrical processing methods such as electrical discharge processing to produce a heat-resistant base mold, bringing this base mold into contact with a glass blank softened by heating to transfer the surface shape of the base mold, employing a grinding program for each surface shape to be obtained, and forming a base mold having a corresponding surface shape.

In recent years, the demand has increased for multifocal eyeglass lenses being made thinner and lighter by incorporation of axially symmetric, aspherical lens design. The hot sag molding method has been proposed (see Japanese Unexamined Patent Publication (KOKAI) Heisei Nos. 6-130333 and 4-275930) as a method for forming molds to produce eyeglass lenses having such complex shapes.

DISCLOSURE OF THE INVENTION

In the hot sag forming method, a glass material comprised of a thermosoftening substance such as glass is placed on a mold, and softened by being heated to a temperature greater than or equal to its softening point, causing it to tightly contact with the mold. The shape of the mold is thus transferred to the upper surface of the glass material, yielding a formed article of desired surface shape. Thus, since the hot sag forming method is a forming method in which the upper surface of the glass material is indirectly formed without being brought into contact with the mold, it is difficult to control the shape of the upper surface. In particular, a mold having an aspherical surface shape is employed to manufacture molds for multifocal eyeglass lenses. However, it is extremely difficult to transfer such a complex shape with high precision to the upper surface of the glass material.

Further, the optical surface shape of eyeglass lenses varies by item based on the degree and the like. Thus, it is required to design the surface shape of the mold based on the item to obtain a mold for lens for forming a desired optical surface. However, the shape of the glass material changes in a complex manner when softened by heating. Thus, even when employing a mold having a forming surface that has been designed to yield a shape corresponding to a desired optical surface, it is difficult to mold the upper surface of the glass material into a desired shape. For this reason, in practice, in the designing of glass materials and molds, multiple shape corrections are made respectively to the glass material and mold. In this manner, the designing of molds and glass materials for obtaining formed articles of desired shape is no easy matter.

Under such circumstances, it is an object of the present invention to provide a means for forming the upper surface of the glass material to a desired shape.

A further object of the present invention is to provide a means for easily and simply determining the surface shape of the mold and glass material for manufacturing formed articles of desired shape.

The present inventors conducted extensive research to achieve the above-stated objects, resulting in the discovery that the above-described objects were achieved by heat-softening a glass material with both an upper surface and a lower surface being spherical on a forming surface with free-form surface shapes other than spheres to form the upper surface of the glass material into a roughly offset surface relative to the forming surface of the mold. The present invention was devised on that basis.

The present invention relates to:
a method of manufacturing a formed article comprising forming an upper surface of a glass material that has been positioned on a forming surface of a mold to obtain the formed article by heating the glass material to a temperature permitting deformation to bring a lower surface of the glass material into tight contact with the forming surface, wherein glass having upper and lower surfaces being spherical in shape is employed as the glass material, a mold having a forming surface being a free-form surface other than a spherical surface is employed as the mold, the upper surface of the glass material is formed into a roughly offset surface relative to the forming surface of the mold.

Furthermore, the present invention relates to:
a glass material for use in a forming method in which an upper surface of a glass material that has been positioned on a forming surface of a mold, the forming surface being a free-form surface other than a spherical surface, is formed into a roughly offset surface relative to the forming surface of the mold to obtain a formed article by heating the glass material to a temperature permitting deformation to bring a lower surface of the glass material into tight contact with the forming surface, which has upper and lower surfaces being spherical in shape as well as is of essentially equal thickness in a normal direction.

Furthermore, the present invention relates to:
a method of determining a shape of a forming surface of a mold for use in a forming method in which an upper surface of a glass material that has been positioned on a forming surface of a mold is formed into a desired shape to obtain a formed article by heating the glass material to a temperature permitting deformation to bring a lower surface of the glass material into tight contact with the forming surface, wherein the forming surface is a free-form surface other than a spherical surface, under the assumption that the glass material has upper and lower surfaces being spherical in shape and is of essentially equal thickness in a normal direction, the shape of the forming surface is determined based on the desired shape of the upper surface and the thickness in a normal direction of the glass material.

Furthermore, the present invention relates to:

a method of manufacturing a formed article comprising forming an upper surface of a glass material that has been positioned on a forming surface of a mold to obtain the formed article by heating the glass material to a temperature permitting deformation to bring a lower surface of the glass material into tight contact with the forming surface, wherein a glass material having upper and lower surfaces being spherical in shape as well as being of essentially equal thickness in a normal direction is employed as the glass material, a mold having a forming surface being a free-form surface other than a spherical surface as well as of which forming surface shape has been determined by the method of determining a shape of a forming surface of the present invention is employed as the mold.

Furthermore, the present invention relates to:

a method of determining a shape of a lower surface of a glass material for use in a forming method in which an upper surface of a glass material that has been positioned on a forming surface of a mold is formed into a desired shape to obtain a formed article by heating the glass material to a temperature permitting deformation to bring a lower surface of the glass material into tight contact with the forming surface, wherein the forming surface is a free-form surface other than a spherical surface, under the assumption that the glass material has upper and lower surfaces being spherical in shape and is of essentially equal thickness in a normal direction, the shape of the forming surface is determined based on the desired shape of the upper surface and a shape of a forming surface that has been determined based on the thickness of the glass material in a normal direction.

Furthermore, the present invention relates to:

a method of determining a shape of a lower surface of a glass material for use in a forming method in which an upper surface of a glass material that has been positioned on a forming surface of a mold is formed into a desired shape to obtain a formed article by heating the glass material to a temperature permitting deformation to bring a lower surface of the glass material into tight contact with the forming surface, wherein the formed article is a casting mold or a portion of a casting mold for single-vision eyeglass lens, the eyeglass lens is a progressive dioptric power lens having one reference point for measurement of far dioptric power and one reference point for measurement of near dioptric power, the forming surface is a free-form surface other than a spherical surface, under the assumption that the glass material has upper and lower surfaces being spherical in shape and is of essentially equal thickness in a normal direction, the shape of the lower surface determined as a surface having a spherical shape of which mean curvature is roughly identical to a mean curvature at the reference point for measurement of far dioptric power of the progressive dioptric power lens.

Furthermore, the present invention relates to:

a method of manufacturing a formed article comprising forming an upper surface of a glass material that has been positioned on a forming surface of a mold to obtain the formed article by heating the glass material to a temperature permitting deformation to bring a lower surface of the glass material into tight contact with the forming surface, wherein a mold having a forming surface being a free-form surface other than a spherical surface is employed as the mold, a glass material that has upper and lower surfaces being spherical in shape, is of essentially equal thickness in a normal direction as well as of which lower surface shape has been determined by the method of determining a shape of a lower surface of the present invention is employed as the glass material.

The present invention permits the manufacturing of formed articles of desired shape with high precision by hot sag molding method.

The present invention also permits the easy and simple determination of the surface shapes of molds and glass materials employed in hot sag molding method.

BEST MODE FOR CARRYING OUT THE INVENTION

The present invention will be described in greater detail below.

The method of manufacturing a formed article of the present invention is a method of manufacturing a formed article comprising forming an upper surface of a glass material that has been positioned on a forming surface of a mold to obtain the formed article by heating the glass material to a temperature permitting deformation to bring a lower surface of the glass material into tight contact with the forming surface, wherein glass having upper and lower surfaces being spherical in shape is employed as the glass material, a mold having a forming surface being a free-form surface other than a spherical surface is employed as the mold, and the upper surface of the glass material is formed into a roughly offset surface relative to the forming surface of the mold.

In the method of manufacturing a formed article of the present invention, the upper surface of the glass material is formed into a roughly offset surface relative to the forming surface of the mold. The term "offset surface relative to the forming surface of the mold" means a surface for which the spacing in the normal direction between the surface and the forming surface of the mold is constant. Thus, the term "offset" clearly differs from the term "similar." The term "roughly offset surface" means that the main elements of the surface shape of the mold are comprised of offsets, and are comprised of the surface shape along with the correction and processing errors applied to achieve other objects. That is, in the present invention, the upper surface of the glass material following forming and the forming surface of the mold have a roughly offset relation whereby the spacing in the normal direction is approximately equal at all positions. The method of manufacturing formed articles of the present invention permits the manufacturing with high precision of formed articles of desired shape by employing a mold having a forming surface that is roughly offset relative to the desired upper surface shape of the glass material. Further, by determining the surface shape (upper surface shape of the glass material) that is to be finally formed, it suffices to design a mold with a forming surface that satisfies the roughly offset relation relative to this surface shape, permitting the ready design of the forming surface. Further, there is an advantage in that formed articles of complex surface shape, such as molds for multifocal eyeglass lenses, can be obtained from the glass material having two spherical surfaces that are easy to process and design.

A glass material that is of essentially equal thickness in the normal direction can be employed in the present invention, thereby permitting forming of the upper surface of the glass material into a roughly offset surface relative to the forming surface of the mold. Here, the phrase "essentially equal thickness in the normal direction" means that at least the geometric center of the glass material, or at the optical center point containing the point for measurement of the far degree, the degree of change in thickness as measured in the normal direction is less than or equal to 1.0 percent, preferably less than or equal to 0.8 percent.

The shape of the glass material prior to processing by heat-softening will be described below based on FIG. 1. FIG. 1 shows an example (sectional view) of glass that is essentially equal in thickness in the normal direction.

In FIG. 1, glass material 206 has a meniscus shape with concave and convex surfaces, the external shape being round. The surface shapes of the concave surface 202 and the convex surface 201 of the glass material are both spherical.

The term "normal direction" of the two surfaces of the glass material means the direction that is perpendicular to the glass material surface at any position on the surface of the glass material. Accordingly, the normal direction changes at each position on the surface. For example, direction 204 in FIG. 1 denotes the normal direction at point 208 on the concave surface of the glass material. The points of intersection of normal direction 204 with the concave and convex surfaces are 208 and 209, respectively. Thus, the interval between 208 and 209 is the thickness in the normal direction. There are other positions on the concave glass surface, such as 210 and 212, the normal directions of which are 203 and 205, respectively. In normal direction 203, the interval between 210 and 211, and in normal direction 205, the interval between 212 and 213, is the thickness in the normal direction. In a glass material of equal thickness in the normal direction, this spacing between the upper and lower surfaces in the normal direction is a constant value. That is, in glass materials of equal thickness in the normal direction, the upper and lower surfaces are parts of a spherical surface sharing a single center (207 in FIG. 1).

In this connection, FIG. 2 shows a schematic diagram of the state of contact between the glass material and the mold before and after heat-softening. As shown in FIG. 2(a), the present inventors conducted an extensive research into the shape deformation due to heat-softening of the glass material when placed on the mold such that at least part of the lower surface rim portion of the glass material was in tight contact with the forming surface and the lower surface center portion of the glass material was separated from the mold. As a result, they discovered that once the glass material had been positioned as shown in FIG. 2, heat-softening caused deformation where the upper (concave) surface of the glass material contracted in a direction parallel to the surface and the lower (convex) surface expanded in a direction parallel to the surface. The present inventors conducted further repeated research, resulting in the discovery that in the shape deformation resulting from heat-softening of the glass material, the spacing in the normal direction of the concave and convex surfaces was almost maintained with quite little change before and after the shape deformation. FIG. 2 shows an example in which the upper surface is concave and the lower surface is convex. Similarly, when the upper surface is convex and the lower surface is concave, the interval in the normal direction of the concave and convex surfaces is almost maintained with quite little change before and after the shape deformation. Details have not yet been clearly determined; this is thought to be caused by the fact that the glass deformation due to heat-softening could be identical to or approximate to the deformation in a viscoelastic material.

A summary of viscoelastic materials will be given here. First, an elastic material is a material that extends in a manner proportional to the magnitude of a force to which it is subjected, returning to its original form when the force is removed. A viscous material is a material having the property of gradually deforming when subjected to a force, but maintaining the shape when the force is removed. And a viscoelastic material is a material having the properties of both elastic and viscous materials; namely, it has the property of deforming like an elastic material when subjected to a force, but maintains the shape once the force has been removed. For the sake of simplicity, the example of plate glass will be addressed below to further describe the shape deformation of a viscoelastic material.

FIG. 3 is a drawing showing the deformation of a viscoelastic material in the form of plate glass. When plate glass is deformed by heat-softening, it is thought to deform in a circular arc shape, like an elastic material, with one surface extending and the opposite surface contracting. When this happens, there is a plane between the two surfaces of the glass where neither elongation nor contraction occurs. This is called the neutral surface. This cross-section is called the neutral line. Assuming that the glass plate approximates a viscoelastic material, and R denote the radius of curvature of neutral line AB in FIG. 3, the length of curve CD, which is separated in the normal direction by $\delta$ (delta)R, can be approximated by $(R+\delta R)\theta$ (theta).

Additionally, the cross-section of a viscoelastic material maintains a flat surface that remains undistorted following deformation, orthogonal to the neutral surface and the two surfaces. Accordingly, the heat-softened glass material deforms like an elastic material, and following deformation, behaves like a viscous material, retaining its shape. The present inventors discovered that the thickness of the glass material in the normal direction remained essentially unchanged in this manner, and that the spacing of the upper and lower surfaces of the glass material in the normal direction remained nearly identical before and after deformation. That is, it is preferred that the glass material employed in the present invention is of essentially equal thickness in the normal direction, and the thickness in the normal direction essentially does not change before and after deformation. Here, "the thickness in the normal direction essentially does not change before and after deformation" means that the rate of change in the normal direction of thickness before and after deformation at the far measurement points specified by JIS is less than or equal to 1 percent.

The use of such a glass material permits the high precision forming of the upper surface of the glass material in such a manner as to produce an offset, or roughly offset, relative to the forming surface of the mold.

In order to approximate a glass material to a viscoelastic material, it is desirable for the outer diameter of the glass material to be adequately large relative to the thickness in the normal direction of the glass material, and for the outer diameter of the glass material to be adequately large relative to the amount of distortion in a direction perpendicular to the glass. Specifically, for the glass material employed in the present invention to be assumed as a viscoelastic material, it is desirable for the thickness in the normal direction to be 2 to 10 nm, preferably 5 to 7 nm. Further, the outer diameter of the glass material is desirably 60 to 90 nm, preferably 65 to 86 nm. The "outer diameter" of the glass material is the distance between any point on the lower surface edge rim portion of the glass material and the opposite point on the edge rim.

The present invention also relates to a method of determining a shape of a forming surface of a mold for use in a forming method in which an upper surface of a glass material that has been positioned on a forming surface of a mold is formed into a desired shape by heating the glass material to a temperature permitting deformation to bring a lower surface of the glass material into tight contact with the forming surface, wherein the forming surface is a free-form surface other than a spherical surface, and under the assumption that the glass material has upper and lower surfaces being spherical in shape and is of essentially equal thickness in a normal direction, the shape of the forming surface is determined based on the desired shape of the upper surface and the thickness in a normal direction of the glass material.

As set forth above, the thickness of the upper and lower surfaces of the glass material in the normal direction is almost maintained before and after deformation by heat-softening. Accordingly, the spacing in the normal direction of the upper surface of the glass material and the forming surface of the mold after forming can be assumed as being essentially identical to the thickness in the normal direction of the glass prior to forming. Thus, the shape of the forming surface of the mold can be determined based on the desired shape of the upper surface of the glass material and the thickness of the glass material in the normal direction. That is, the surface shape of the forming surface of the mold can be determined by determining the desired shape of the upper surface of the glass material, and then determining a surface such that the spacing in the normal direction with the surface of the shape that has been determined matches the thickness of the glass material in the normal direction.

The present invention also relates to a method of determining a shape of a lower surface of a glass material for use in a forming method in which an upper surface of a glass material that has been positioned on a forming surface of a mold is formed into a desired shape by heating the glass material to a temperature permitting deformation to bring a lower surface of the glass material into tight contact with the forming surface, wherein the forming surface is a free-form surface other than a spherical surface, and under the assumption that the glass material has upper and lower surfaces being spherical in shape and is of essentially equal thickness in a normal direction, the shape of the forming surface is determined based on the desired shape of the upper surface and a shape of a forming surface that has been determined based on the thickness of the glass material in a normal direction.

When manufacturing a mold for progressive dioptric power eyeglass lenses having one reference point for measurement of far dioptric power and one reference point for measurement of near dioptric power by the present invention, the shape of the lower surface of the glass material is desirably determined to be a surface having a spherical shape with a mean curvature roughly identical to the mean curvature at the reference point for measurement of far dioptric power. Thus, the lower surface of the glass material and the forming surface of the mold can be contacted at least three points, as will be set forth further below, and a spherical glass material can be stably placed on the forming surface of a mold that is aspherical in shape. Progressive dioptric power lenses and reference points for measurement of dioptric power will be described in detail further below. Since a glass material of equal thickness in the normal direction and having spherical upper and lower surfaces is employed in the present invention, determining the shape of the lower surface of the glass material as mentioned above permits determination of the shape of the upper surface of the glass material based on the thickness in the normal direction.

A glass material with two spherical surfaces is employed in the present invention. Thus, by determining the shape of the forming surface of the mold as set forth above when manufacturing a mold for a single-vision eyeglass lens, the shape of the lower surface of the glass material can be determined based on the shape of the forming surface of the mold that has been determined. The method of determining the shape of the lower surface will be described below.

In the present invention, the lower surface of the glass material is spherical. Thus, the radius of curvature can be obtained and the shape of the lower surface can be then determined by determining a total of three points consisting of the center of the spherical surface and any opposing two points positioned on the circumference. For example, as shown in FIG. 2(a), when the glass material is placed on the mold so that at least a portion of the edge of the lower surface rim is in tight contact with the forming surface and the center portion of the lower surface of the glass material is separated from the forming surface, assume that the lower surface of the glass material is in contact with the forming surface at one point on the edge of the rim of the lower surface of the glass material and a point opposite this point (E and E' in FIG. 2(a)). Since the lower surface of the glass material is spherical, the above contact positions become points on the circumference of a circle at a fixed distance from the center on the forming surface of the mold. The distance between the two points (E and E' in FIG. 2(a)), matches the outer diameter of the glass material. Next, a point (point C in FIG. 2(a)) removed from the center position of the forming surface of the mold by a distance T in the vertical direction is specified. Distance T corresponds to the spacing between the lower surface of the glass material and the forming surface of the mold before heating, and can be determined by considering the dimensions of the glass material, its thermal deformation properties, and the like. For example, it can be set to 0.2 to 5 mm.

The spherical shape passing through E, E', and C, that is, the shape of the lower surface of the glass material, is thus determined.

The method of determining the shape of the lower surface of the glass material will be described in greater detail.

In FIG. 2(a), when the vertical distance between the line connecting E and E' (the dotted line in FIG. 2(a)) and the center of the forming surface is denoted as dt (mm), the distance between E-E' is denoted as D (mm), and the mean curvature of the forming surface is denoted as R, dt can be obtained from the following equation:

$$dt = R - \sqrt{R^2 - \left(\frac{D}{2}\right)^2} \qquad \text{[Numeral 1]}$$

Then, based on dt calculated and the distance T (mm) between the center of the lower surface of the glass material and the center of the forming surface, the radius of curvature r of the lower surface can be obtained from the following equation:

$$r = (dt - T)^2 + \frac{(D/2)^2}{2(dt - T)} \qquad \text{[Numeral 2]}$$

The shape of the lower surface of the glass material can be determined in this manner.

Further, by determining the shape of the lower surface of the glass material in the above-described manner using a glass material having two spherical surfaces that is of equal thickness in the normal direction, the shape of the upper surface of the glass material can be determined from the shape of the lower surface that has been determined and the thickness of the glass material in the normal direction. That is, a surface, in which the spacing in the normal direction of the lower surface having the surface shape that has been determined matches the thickness of the glass material in the normal direction, can be determined as the upper surface of the glass material.

In the present invention, formed articles can be manufactured using a glass material and a mold, the surface shape of which has been determined as set forth above. In order to conduct high precision forming using the glass material and mold the surface shape of which has thus been determined, glass materials that have the aforementioned desirable thickness in the normal direction and outer diameter for well approximation for a viscoelastic material are preferably employed. In this manner, the shape of the upper surface of the glass material can be formed as a roughly offset surface relative to the forming surface of the mold.

A mold that can be employed in the present invention will be described below.

The mold on which the glass material is placed is not specifically limited other than that it has a forming surface of free-form shape that is not a spherical surface. Known molds employed in the hot sag forming method may be utilized.

The above free-form shape means a surface shape that is comprised of a surface in which the curvature at the position for far measurement on the optical surface differs from the curvature at other positions. Examples are surface shapes comprised of optical surfaces such as axially symmetric aspherical dioptric power lenses, progressive dioptric power lenses, and progressive dioptric power lenses, both surfaces of which are aspherical.

A spherical shape means a shape in which the curvature is constant in the position for far measurement and at other positions on the optical surface of the lens. The term axially symmetric aspherical shape means, for example, a shape in which the curvature at the position for far measurement located in the geometric center differs from the curvature at other positions on the optical surface of the lens. Generally, axially symmetric aspherical lenses have a shape in which a position for far measurement is located in the geometric center, and the curvature increases, or decreases, continuously with the distance from the center of the lens along a principal longitude running from the center to the rim portion of the lens. A center symmetric aspherical lens has the cross-section shown in FIG. 11b, for example. A progressive dioptric power lens is a lens that is employed as a progressive dioptric power lens for presbyopia. While being employed in presbyopic eyeglasses, progressive dioptric power lenses afford the advantage of not being readily identifiable as presbyopic eyeglasses based on exterior appearance and the advantage of providing continuously clear, unbroken vision from far to near. They are thus widely employed in general. However, without introducing boundary lines into the limited lens area, multiple visual fields are provided, including a visual field for viewing distance, a visual field for viewing up close, and visual fields for viewing intermediate distances. Examples of progressive dioptric power lens that can be processed by the present invention include, first, a single-sided progressive dioptric power lens having a progressive surface either on a first dioptric surface that is the object-side surface, or a second dioptric surface that is the eyeball-side surface, second, dual-surface aspherical progressive dioptric power lens with progressive dioptric power effects distributed between the first dioptric surface that is the object-side surface and the second dioptric surface that is the eyeball-side outer surface, in which the first surface and the second surface collectively impart a far degree and introduction degrees based on the prescription. The progressive dioptric power lens has, for example, a degree distribution such as that shown in FIGS. 7 to 10, or the cross-section shown in FIGS. 11a and 11c.

Further, a mold having a forming surface of prescribed roughness is desirably employed in the present invention. The forming surface of the mold generally employed in hot sag forming method is mirror processed by polishing. However, when the forming surface of the mold coming into contact with the glass material is a smooth surface such as a polished surface, it often fuses to the glass, the surface of the mold is scratched during removal of the glass material, or the like, compromising durability. Fusion to the glass material can be prevented by employing a mold having a forming surface of prescribed roughness. This point will be described based on FIG. 4.

FIG. 4 shows an enlarged schematic diagram of the state of contact between the mold and the glass material before and after heat-softening in a mold having a forming surface of prescribed roughness. As shown in FIG. 4, even when the forming surface of prescribed roughness fuses to a portion of the glass material with the progress of softening, the fusion does not occur over the entire forming surface, but is limited to just protruding portions, and strong adhesion does not develop between the glass material and the forming surface of the mold. Thus, it becomes easy to separate the glass material from the mold, making it possible to avoid damage to the mold and to the glass material (formed article) following softening. However, when the forming surface is excessively rough, there is a risk of affecting the shape of the upper surface of the glass material and of not being able to obtain a desired surface shape. In consideration of the above, by way of example, a mold having a plurality of irregularities with a maximum height Rmax falling within a range of 0.1 to 100 micrometers and an average spacing S between local peaks falling within a range of 0.01 to 1.00 mm is desirably employed as the mold. The above Rmax refers to a value that is measured according to the definition of surface roughness specified in JIS BO601-1982. The average spacing S between local peaks is a value measured according to the definition specified in JIS K7125. The above maximum roughness height Rmax is desirably 1 to 10 micrometers, preferably 3 to 9 micrometers. The above average spacing between local peaks S is desirably 0.01 to 0.1 mm, preferably 0.05 to 0.5 mm. The roughness of the forming surface is desirably 0.01 to 10 micrometers, preferably 0.1 to 1 micrometer, and more preferably, 0.3 to 0.9 micrometer, as arithmetic average roughness Ra measured according to the definition of surface roughness specified in JIS BO601-1982. Within the above-stated ranges, it is possible to both prevent fusion and achieve forming precision.

The above height and spacing of the irregularities can be measured primarily using a Form Talysurf made by Taylor Hobson Corp., for example. With the Form Talysurf, a ruby or a diamond is positioned at the tip of the probe; the tip of the probe is displaced over the surface of, and in contact with, the lens; and the lens surface is scanned to measure the surface shape. The measurement scanning path is normally just linear. A portion of the surface is measured. The scanning direction during measurement is perpendicular to the irregularities on the forming surface of the mold. Following measurement, the height and spacing of the irregularities on the forming surface of the mold are determined by analysis of the values measured for the height and spacing of the irregularities.

The above mold can be formed from materials that are generally employed in known molds employed in the hot sag forming method. Since metals have poor durability at 800° C., which is generally the maximum temperature of softening processing, and have high coefficients of thermal expansion, the shape is greatly deformed by thermal expansion occurring with temperature changes in the vicinity of 800° C. When the level of change is great, there is a risk that at least either the glass material or mold will not be able to withstand the difference in contraction during cooling at the contact surface between the glass material and the mold, and will be damaged. Accordingly, the mold employed in the present invention is desirably made of a heat-resistant material having good durability and a coefficient of expansion that is close to that of the glass material. Examples of such heat-resistant materials are alumina-based ($Al_2O_3$), AlTiC-based ($Al_2O_3$-TiC), zirconia-based ($ZrO_2$), silicon nitride-based ($Si_3N_4$), aluminum nitride-based (AlN), and silicon carbide-based (SiC) ceramics, as well as other ceramics having primary components in the form of $SiO_2$, $Al_2O_3$, or MgO. Here, the term "having primary components in the form of" means that these components account for equal to or greater than 50 mass percent of the structural components of the mold.

First, a mold material that has, for example, a hardness (Vickers hardness) of 7 to 24 Hv, a curvature strength of 400 to 2,000 MPa, a Young's modulus of 180 to 410 GPa, a thermal conductivity of 3.0 to 170 W/mk, a coefficient of linear expansion of 4.30 to 10.8×10E-6, a heat resistance temperature of 750 to 850° C., and a density of 3.10 to 10.70 g/cm³ is suitable. Second, a material having a hardness (Vickers hardness) of 7 to 15 Hv, a Young's modulus of 190 to 210 GPa, a coefficient of linear expansion of 6.0 to 7.0×10E-6, and a heat resistance temperature of 775 to 825° C. is particularly suitable. Third, a material having a hardness (Vickers hardness) of 9 to 15 Hv, a Young's modulus of 180 to 402 GPa, a coefficient of linear expansion of 4.30 to 10.8×10E-6, and a heat resistance temperature of equal to or higher than 800° C. is particularly suitable. The mold material is also desirably hydrophobic.

The forming surface of the above-stated surface roughness can normally be obtained by grinding or cutting alone, without polishing. In the present invention, high-precision spherical glass materials having spherical polished surfaces and molds with a free-form shape other than a spherical surface can be combined to readily form the optical surfaces of free-form surfaces other than spherical surfaces. When the forming surface has the above-stated surface roughness, a mirror-finished free-form glass optical surface can be obtained without a need for the step of polishing the forming surface to a shape having a free-form surface. This is highly advantageous from the perspectives of cost and productivity.

In the present invention, the glass material is placed on the forming surface of the mold prior to forming. The glass material can be positioned on the mold so that at least a portion of the rim of the lower surface of the glass material comes into contact with the forming surface and the center portion of the lower surface of the glass material is separated from the mold. In the present invention, since a glass material, the lower surface of which is spherical in shape, is placed on a forming surface having a free-form shape that is not spherical, stable positioning of the glass material is desirably achieved by positioning the glass material so that at least three points on the lower surface rim portion are in contact with the forming surface.

The method of manufacturing a formed article of the present invention can be employed to manufacture a casting mold for eyeglass lenses by cast polymerization, or to manufacture a portion of such a casting mold. Generally, eyeglass lenses are classified as single-vision eyeglass lenses, multifocal eyeglass lenses, or progressive dioptric power eyeglass lenses. Summaries of progressive dioptric power lenses are given in JIS T 7315 and JIS T 7330. Progressive dioptric power eyeglass lenses will be described below.

In progressive dioptric power eyeglass lenses, the far, intermediate, and near visual field regions are apportioned based on the frequency of use. The far region, which has a high use frequency, is often made broad, and is designed based on the emphasis of long-range or short-range. Applications vary based on differences in the breadth of the visual field region corresponding to the object distance. It is possible to distinguish three main categories: general-purpose progressive dioptric power lenses, intermediate near progressive dioptric power lenses, and near progressive dioptric power lenses. There are also types with long-range emphasis and long-medium-range emphasis. General-purpose progressive dioptric power lenses are put to both long and short-range use, and have functions that permit both long and short-range vision. However, they are limited in the breadth of the visual field they afford in the medium and near regions. Generally, the broader the long and short-range visual field region, the greater the tendency for the distortion and swing particular to progression to be produced on the intermediate range side. Intermediate and near progressive dioptric power lenses are imparted with a broad intermediate region and near region by limiting the far region. The far region occupies a higher position than the general-purpose one and has a long progression band, so there is little of the distortion and swing particular to progression. However, such lenses are not suited to long-range vision. Near progressive dioptric power lenses primarily have near ranges and do not have far ranges; they are thus sometimes classified as single-vision lenses. All of the above categories of progressive dioptric power lenses are suitable as object lenses manufactured using casting molds in the form of formed articles manufactured either by the manufacturing method of the present invention or using the mold of the present invention, described further below.

Progressive dioptric power lenses can be divided into three groups based on the disposition of progressive elements on the concave and convex surfaces of the lens. The first group consists of convex (external) surface progressive dioptric power lenses in which the progressive surface is disposed on the convex surface. The second group consists of concave (internal) surface progressive dioptric power lenses in which the progressive surface is disposed on the concave surface. And the third group consists of dual-surface aspherical progressive (also referred to as dual-surface compound progressive) dioptric power lenses, in which the progressive elements are divided between the two surfaces.

Convex surface progressive dioptric power lenses have a progressive surface on the convex surface, with the progressive dioptric power being formed based on the shape of the optical surface of the convex surface. Concave progressive dioptric power lenses are similar, with the exception of the difference in concavity and convexity.

Dual-surface aspherical progressive dioptric power lenses are imparted with the advantages of both "external surface progressive dioptric power lenses" and "internal surface progressive dioptric power lenses." Thus, they are progressive dioptric power lenses having a structure in which changes in the dioptric power in the vertical direction relating to the length of the progression band are distributed and positioned on the convex surface side, and changes in the dioptric power in the horizontal direction relating to swing and distortion are distributed and positioned on the concave surface side. The surface of this "dual-surface compound progression" is comprised of special aspherical surfaces that are not progressive surfaces on both surfaces, and differ structurally from the conventional progressive dioptric power lenses called "dual-surface progressive dioptric power lenses" in which the prescribed degree added is split between both surfaces being progressive surfaces. Since both surfaces of the lens can be used compositively, clear visual fields can be broadened for the far, intermediate, and near ranges. In particular, swing and distortion along the perimeter of the lens are improved.

JIS T7315, JIS T7313, and JIS T7330 specify reference points for measurement of the dioptric power as reference points for measurement of the refractive indexes of eyeglass lenses. The reference points for the measurement of dioptric power are portions that are enclosed by circles about 8.0 to 8.5 mm in diameter, for example, on the surface on the object side or on the eyeball side of an eyeglass lens. In single-vision eyeglass lenses, the reference point for measurement of dioptric power is located in the center of the surface of the lens. In progressive dioptric power lenses and multifocal eyeglass lenses, there are multiple reference points for measurement of dioptric power. As is set forth further below, progressive dioptric power lenses can be roughly divided into the groups of general-purpose progressive dioptric power lenses, intermediate near progressive dioptric power lenses, and near progressive dioptric power lenses. There are two reference points for measurement of dioptric power, called the reference point for measurement of the far portion and the reference point for measurement of the near portion, in general-purpose progressive dioptric power lenses and intermediate near progressive dioptric power lenses. There are two reference points for measurement of near portions in near progressive dioptric power lenses.

Progressive lenses are generally formed into aspherical shapes that are vertically and right-left asymmetric, and are comprised of shapes of greater complexity than spherical shapes. The intermediate region positioned between the reference point for measurement of the far portion and the reference point for measurement of the near portion in a progressive dioptric power lens is called the progression band. Within this band, the dioptric power varies progressively. The reference point for measurement of the near portion is located at a position corresponding to the convergence of the eyeballs at a position either to the right or to the left of the main meridian, and is determined to be positioned either to the right or left of the main meridian based on the right and left partitioning of the eyeballs. Accordingly, in the case of a convex surface progressive lens, the convex surface has an aspherical shape that is vertically and right-left asymmetric. Since the upper surface of a casting mold for forming such a surface shape is also aspherical in shape, the shape of the forming surface of the mold, which is roughly offset relative to the shape of the upper surface of the casting mold (the desired shape of the upper surface of the glass material), is also aspherical in shape and vertically and right-left asymmetric. However, the glass material is spherical in shape. When the spherical glass material is placed on a vertically and left-right asymmetric forming surface, there are times when it cannot be secured in a stable state and becomes unstable. The same holds true for dual-surface aspherical progressive dioptric power lenses. To stably position a spherical glass material on a forming surface that is aspherical in shape, it is desirable for the glass material to be positioned on the mold so that at least, on the lower surface rim portion of the glass material, two points that are positioned on a side corresponding to the reference point for measurement of far dioptric power of the progressive dioptric power lens and one point that is positioned on a side of the reference point for measurement of near dioptric power are in contact with the forming surface. When the glass material is formed into a formed article (a casting mold or the portion thereof), the surface that was the upper surface of the glass material (the opposite surface from the surface in tight contact with the forming surface) is transferred to the eyeglass lens. The "position corresponding to the reference point for measuring the dioptric power" of the lower surface of the glass material is a portion of the lower surface of the glass material opposite the portion of the upper surface of the glass material serving as the portion that is transferred to the reference point for measuring the dioptric power of the eyeglass lens on the surface of the casting mold obtained. As set forth above, the lower surface of the glass material is formed into a spherical shape having a mean curvature that is roughly identical to the mean curvature at the reference point for measurement of the far dioptric power of the progressive dioptric power lens that is to be finally obtained, thereby making it possible to stably position the glass material on the forming surface with three support points above.

FIG. 12(a) is a descriptive drawing of the contact between the lower surface of the formed material for manufacturing a casting mold of progressive dioptric power lenses and the forming surface of the mold. In FIG. 12(a), support points A, B, and C are contact points of the lower surface of the glass material with the forming surface. In FIG. 12(a), support points A and B, which lie above a line corresponding to the lens horizon (also referred to as the "horizontal reference line" or "principal longitude") running through two alignment reference points, are two points positioned on the side corresponding to reference points for measurement of the far dioptric power, and support point C, which is lower than the meridian, is a point positioned on the side corresponding to a reference point for measurement of the near dioptric power. As shown in FIG. 12(a), the two points positioned on the side corresponding to reference points for measurement of the far dioptric power are desirably positioned symmetrically about the line corresponding to the main meridian that runs through the reference point for measurement of the far dioptric power of the progressive dioptric power lens on the lower surface of the glass material. Further, when the lens that is to be obtained in the end has a surface shape with only one progressive surface, the support point on the side corresponding to the reference point for measurement of the near dioptric power is desirably positioned on the opposite side from the reference point for measurement of the near dioptric power relative to the line corresponding to the main meridian as shown in FIG. 12(a). Additionally, as shown in FIG. 12(b), when the lens that is to be obtained in the end has an aspherical shape with progressive elements (such as the convex surface of the HOYALUX iD made by HOYA (Co., Ltd.)), the contact point positioned on the side corresponding to the reference point for measurement of the near dioptric power is desirably positioned on the line corresponding to the main meridian (support point F in FIG. 12(b)).

The "line corresponding to the main meridian running through the reference point for measurement of the far dioptric power" on the lower surface of the glass material refers to the portion on the lower surface of the glass material opposite the portion on the upper surface of the glass material becoming the portion that is transferred to the portion in which the main meridian of the eyeglass lens is positioned on the surface of the casting mold.

In the embodiments described below, at least three of the above points are desirably contact (support) points; however, there may be four or more contact points.

In a single-vision eyeglass lens, it is desirable for the glass material to be positioned so that the entire circumference of the lower surface rim portion is in contact with the forming surface.

The glass material is not specifically limited. Glasses such as crown-based, flint-based, barium-based, phosphate-based, fluorine-containing, and fluorophosphate-based glasses are suitable. In a first example, suitable glass is glass comprising $SiO_2$, $B_2O_3$, and $Al_2O_3$ as the structural components having the glass material composition of, given as molar percentages, 45 to 85 percent $SiO_2$, 4 to 32 percent $Al_2O_3$, 8 to 30 percent $Na_2O+Li_2O$ (with $Li_2O$ constituting equal to or less than 70 percent of $Na_2O+Li_2O$), the total quantity of ZnO and/or $F_2$ being 2 to 13 percent (where $F_2$<8 percent), $Li_2O+Na_2O/Al_2O_3$ being ⅔ to ⁴⁄₁, and $SiO_2+Al_2O_3+Na_2O+Li_2O+ZnO+F_2$>90 percent.

In a second example, suitable glass are glass having the glass material composition of, given as molar percentages, 50 to 76 percent $SiO_2$, 4.8 to 14.9 percent $Al_2O_3$, 13.8 to 27.3 percent $Na_2O+Li_2O$ (where $Li_2O$ is less than or equal to 70 percent of $Na_2O+Li_2O$), the total quantity of ZnO and/or $F_2$ being 3 to 11 percent (where $F_2$<8 percent), $Li_2O+Na_2O/Al_2O_3$ being ⅔ to ⁴⁄₁, and $SiO_2+Al_2O_3+Li_2O+Na_2O+Li_2O+ZnO+F_2$>90 percent.

In a third example, the glass composition is: $SiO_2$ (47.8 percent), $Al_2O_3$ (14.0 percent), $Na_2O$ (12.1 percent), $B_2O_3$ (percent), ZnO (6.0 percent), $F_2$ (2 percent), MgO (2 percent), $Li_2O$ (16.1 percent), $As_2O_3$ (0.3 percent).

In a fourth example, a further suitable glass composition is: $SiO_2$ (63.6 percent), $Al_2O_3$ (12.8 percent), $Na_2O$ (10.5 percent), $B_2O_3$ (1.5 percent), ZnO (6.3 percent), $Li_2O$ (4.8 percent), $As_2O_3$ (0.3 percent), $Sb_2O_3$ (0.2 percent). Other metal oxides, such as MgO, PbO, CdO, $B_2O_3$, $TiO_2$, and $ZrO_2$; coloring metal oxides; and the like may be added to stabilize the glass, facilitate melting, and impart color, so long as they do not exceed 10 percent.

As further characteristics of the glass material, for example, suitable thermal properties are: a distortion point of 460 to 483° C., an annealing point of 490 to 621° C., a softening point of 610 to 770° C., a glass transition temperature (Tg) of 510 to 665° C., a yield point (Ts) of 535 to 575° C., a specific gravity of 2.47 to 3.65 (g/cm$^3$), a refractive index, Nd, of 1.52300 to 1.8061, a thermal diffusion rate of 0.3 to 0.4 cm$^2$*min, a Poisson ratio of 0.17 to 0.26, a photoelasticity constant of 2.82×10E-12, a Young's modulus of 6,420 to 9,000 kgf/mm$^2$, and a coefficient of linear expansion of 8 to 10×10E-6/° C. A distortion point of 460° C., an annealing point of 490° C., a softening point of 650° C., a glass transition temperature (Tg) of 485° C., a yield point (Ts) of 535° C., a specific gravity of 2.47 (g/cm$^3$), a refractive index, Nd, of 1.52300, a thermal diffusion rate of 0.3576 cm$^2$*min, a Poisson ratio of 0.214, a photoelasticity constant of 2.82×10E-12, a Young's modulus of 8,340 kgf/mm$^2$, and a coefficient of linear expansion of 8.5×10E-6/° C. are particularly preferred.

The upper surface and lower surface shapes of the above glass materials are designed in the manner described above. By processing the glass into the determined surface shape, a glass material for forming can be obtained. The glass material can be processed by known methods. The shape of the glass material is not specifically limited so long as the upper and lower surfaces are spherical; it may be spherical, elliptical, have a rotationally symmetric shape (toric lenses, aspherical rotationally symmetric dioptric power lenses), have a free-form surface shape (progressive dioptric power lenses, aspherical dual-surface dioptric power lenses), or the like. A meniscus shape having two polished spherical surfaces is preferred. The surfaces of the glass material are desirably mirror surfaces. The roughness of the surfaces is desirably a roughness maximum height Rmax of less than or equal to 0.04 micrometer and an arithmetic average roughness Ra of less than or equal to 0.005 micrometer. The lower limit of roughness for the glass material is, for example, a maximum roughness Rmax of 0.01 micrometer and an arithmetic average roughness Ra of 0.01 micrometer.

After positioning the glass material on the forming surface of the mold, the glass material is heated to a temperature permitting deformation on the mold. The "temperature permitting deformation" is desirably a temperature that is greater than or equal to the glass transition temperature (Tg). Heating may be conducted by a known method, such as by positioning the mold in an electric furnace. By controlling the atmospheric temperature in the electric furnace to a temperature set for the glass material, the glass material can be heated to a desired temperature. The details of temperature control will be described further below.

As shown in FIG. 2(a), prior to heating, there is a partial gap between the lower surface of the glass material and the forming surface; there is not complete, tight contact. When the glass material is heated while in this state, the fluidity of the glass material increases as it softens. As shown in FIG. 2(b), the lower surface of the glass material contacts tightly with the forming surface. The term "contact tightly" here does not mean a state in which the glass material penetrates into irregularities on the forming surface.

In the present invention, as shown in FIG. 2, it is preferable that a covering member is placed over the mold on which the glass material has been positioned, and the exposed portion on the forming surface side of the mold upon which the glass material has been positioned is desirably covered. In the present invention, the term "covered" means separation of the interior space from the exterior to a degree at which foreign matter such as dust and debris do not enter; the passage of air is permitted.

The surface of the glass material that has been heat-softened is extremely reactive. Since the forming step is normally quite protracted, any foreign matter such as dust in the air and debris in the electric furnace that adheres to the upper surface of the glass material during this period adheres quite strongly, compromising forming precision. Thus, there is a risk of not being able to form an optical surface. Conversely, when the glass material is heat-softened with the exposed portion on the forming surface side of the glass material covered with the covering member, contamination by the above foreign matter is prevented. Further, using a covering member as described above affords the further advantage of not requiring the installation of a large-scale clean room device containing the electric furnace.

The covering member may be of any shape that will cover the exposed portion on the forming surface side of the mold on which the glass material has been positioned. An example of such a covering member will be described based on FIG. 2. However, the present invention is not limited to the embodiment shown in FIG. 2. Below, the covering member is described in the form of a lid. However, the covering member in the present invention is not limited to being a lid.

In the embodiment shown in FIG. 2, an annular support member is positioned between the lid member and the mold, and the edge surface of the step portion of the circumference of the support member is fit into the edge surface of the opening of the lid. When such a support member is not employed, it suffices to provide a step member to support the covering member on the circumference of the mold and to fit the edge surface of the step member into the opening of the covering member.

The lid member shown in FIG. 2 forms a portion of cylindrical shape. Only the bottom surface of the cylindrical shape is open, there being space present in the interior. The dimensions of the cover member are not specifically limited, but from the perspective of shock resistance and thermal conduction efficiency, a thickness of about 1 to 5 mm, an internal height of about 5 to 100 mm, preferably 30 to 60 mm, are desirable.

A step mount part is formed inside the lid member shown in FIG. 2. The thickness of the lateral surface from the step mount part to the opening is thinner than the lateral surface from the upper surface to the step mount part. Making the edge surface of the opening of the covering member thin in this manner reduces the contact surface between the covering member and the support member (the mold when a support member is not employed) and increases the pressure per unit area that is exerted on the edge surface of the opening by the weight of the covering member itself, permitting greater air tightness within the covering member. When a support member is employed as shown in FIG. 2 and the area of the edge surface of the opening of the lid portion is made small, it becomes possible to reduce the area of contact between the support member and the covering member, thereby reducing the overall size of the support member. Reduction in the size of the support member reduces the amount of thermal expansion of the support member, thereby enhancing the air tightness of the cover member.

The edge surface of the opening of the covering member fitting into the mold or support member is desirably a smooth surface so as to enhance tightness. Further, to achieve uniform heat distribution throughout the glass material, the inside upper surface facing the opening of the covering member is desirably approximate in shape to the upper surface of the glass material, and preferably roughly similar in shape to the shape of the upper surface of the glass material. The inside upper surface facing the opening of the lid member is desirably a roughly flat surface. When the inside upper surface shape of the covering member is approximate in shape to the upper surface of the glass material, it becomes possible to uniformly irradiate the glass material positioned on the forming surface with radiant heat from the covering member, enhancing the uniformity of heat distribution of the glass material. However, the shape of the upper surface of the glass material varies by item. Accordingly, to ensure uniformity of heat distribution in the glass material even when forming multiple glass materials of different upper surface shapes, it is desirable for the inside upper surface of the covering member to be a roughly flat surface. Further, as shown in FIG. 1, the rim portion of the inside upper surface of the covering member is desirably fashioned into a shape with rounded off corners. When corners are present, the heat distribution tends to become partially nonuniform. By providing a rounded off shape as shown in FIG. 1, the heat distribution within the covering member can be rendered uniform. For example, employing a rounded off shape such as set forth above effectively enhances durability when the covering member is made of ceramic, since ceramic tends to break when corners are present.

The covering member fits into the mold or a support member positioned on the mold, thereby separating the interior of the covering member from the outside atmosphere. Separating the interior of the covering member from the outside atmosphere in this manner permits prevention of the scattering of and contamination by foreign matter such as dust and debris, as well as affording a buffering effect that alleviates nonuniformity of temperature distribution and sudden changes in temperature in the atmosphere to which the glass material is exposed. In the conventional hot sag forming method, the glass material is positioned on the mold and introduced into a furnace together with the mold. However, since the heat distribution within the furnace is uneven, it is difficult to uniformly heat multiple glass materials within the furnace. Further, since changes in temperature in the furnace directly affect the glass material, there is a risk of distortion and the like being produced by sudden changes in temperature.

By contrast, the covering member temporarily retains external heat and the covering member itself achieves a uniform temperature distribution. The accumulated heat is then radiated to the interior from the covering member. As set forth above, the shape of the inside upper surface of the covering member can be adjusted to effect controls so that heat that is radiated from various parts of the covering member as a heat source is radiated uniformly onto the glass material, permitting uniform heating of the glass material. Further, sharp temperature changes within the furnace are alleviated by the covering member, preventing the distortion and the like caused by such sharp temperature changes. To conduct heat-softening of the glass material well, the thermal conductivity of the covering member is desirably 3 to 170 W/mk, preferably 90 to 120 W/mk.

The covering member is desirably comprised of a ceramic material with good heat resistance. Examples of such ceramic materials are: alumina-based ($Al_2O_3$), AlTiC-based ($Al_2O_3$-TiC), zirconia-based ($ZrO_2$), silicon nitride-based ($Si_3N_4$), aluminum nitride-based (AlN), and silicon carbide-based (SiC) ceramics, as well as other ceramics having primary components in the form of $SiO_2$, $Al_2O_3$, or MgO. Here, the term "having primary components in the form of" means that these components account for equal to or greater than 50 mass percent of the structural components of the covering member.

A ceramic comprising equal to or greater than 99 percent of $SiO_2$, $Al_2O_3$, and/or MgO, with the remainder being $K_2O$ or the like, is a suitable heat-resistant material for use in the covering member.

First, a material having a hardness (Vickers hardness) of 7 to 24 Hv, a curvature strength of 400 to 2,000 MPa, a Young's modulus of 180 to 410 GPa, a coefficient of linear expansion of 4.30 to 10.8×10E-6, a heat resistance temperature of 750 to 850° C., and a density of 3.10 to 10.70 g/cm$^3$ is an example of a suitable material for the covering member. Second, a material having a hardness (Vickers hardness) of 7 to 15 Hv, a Young's modulus of 190 to 210 GPa, a coefficient of linear expansion of 6.0 to 7.0×10E-6, and a heat resistance temperature of 775 to 825° C. is particularly suitable. Third, a material having a hardness (Vickers hardness) of 9 to 15 Hv, a Young's modulus of 180 to 402 GPa, a coefficient of linear expansion of 4.30 to 10.8×10E-6, and a heat resistance temperature of equal to or higher than 800° C. is particularly suitable. The material of the covering member is also desirably hydrophobic.

The method of manufacturing the covering member is not specifically limited. For example, when the covering member is made of ceramic, it can be produced by powder metallurgy. Specifically, a ceramic powder is packed into a metal mold serving as the casting mold for the covering member and press molding is conducted. Next, the molded ceramic is heated for a prescribed period (for example, about 10 hours) at an elevated temperature of greater than or equal to 1,000° C. (for example, 1,550 to 1,750° C.) to obtain a covering member in the form of a sintered ceramic member. Subsequently, the edge surface of the opening of the covering member is desirably processed for smoothness. This smoothness processing is not specifically limited, and may be conducted by the usual chamfering methods. For example, a diamond dish form with a flat surface can be mounted on the lower shaft of a processing device and rotated at about 200 to 300 rpm to grind the lateral surface of the opening portion of the covering member and obtain a smooth surface. In smoothness processing, it is desirable to feed water (about 1 to 2 L/minute, for example) to the processed surface for cooling.

In the case of a ceramic covering member, it is desirable to process the upper inside surface of the covering member to prevent the scattering of particles. This is to prevent microparticles of ceramic from falling off during forming and contaminating the upper surface of the glass material. The method of applying a glaze and sintering it on can be employed as processing to prevent particle scattering. In the above-described steps of manufacturing the covering member, a glaze can be applied to the upper inside surface of the covering member after press molding but before sintering, so that sintering tightly adheres the glaze to the upper inside surface of the covering member. It suffices to conduct processing to prevent particle scattering at least on the upper inside surface of the covering member facing the upper surface of the glass material. When conducting forming while aspirating air through holes formed in the mold as set forth further below, it is desirable to process the upper inside surface of the covering member to prevent particle scattering while leaving the lateral surfaces unprocessed to allow the passage of air.

A glaze is a viscous substance containing glass particles that is commonly employed to impart luster to the surface of pottery. Generally, glazes are comprised of $SiO_2$, $Al_2O_3$, CaO, MgO, $K_2O$, $Na_2O$, $Fe_2O_3$, $Li_2O$, and the like. After applying the glaze on the upper inside surface of the covering member, it is sintered at a temperature exceeding its melting point to form a coating layer on the inside surface of the covering member by melting the glass particles. This coating layer can prevent ceramic particles from scattering onto the upper surface of the glass material. A glaze having a melting point higher than the heat softening temperature of the glass material, such as a glaze having a melting point of 1,150 to 1,300° C., may be employed. The coating layer formed with a glaze having a melting point higher than the heat softening temperature of the glass material is desirable because it will remain unmelted during molding, preventing particles from scattering.

As shown in FIG. 2, a support member can be positioned on the rim portion of the mold. The support member effectively positions the glass material. The support afforded by the support member will be described below.

When a glass material is supported by the support member, the glass material is desirably positioned so that at least a portion of the lower surface rim portion of the glass material is in tight contact with the forming surface, the center of the lower surface of the glass material is separated from the forming surface, and support is provided by the support member with the lower portion of the lateral surface of the glass material being separated from the support member and at least a portion of the upper edge portion of the lateral surface of the glass material being supported by the support member. By positioning the glass material and providing support by means of the support member in this manner, support can be provided without the glass material and the support member fusing together, with the glass material being positioned and supported on the mold by the support member. This will be described below based on FIGS. 1 and 13. However, the present invention is not limited to the following embodiment.

In the form shown in FIG. 2, a meniscus-shaped glass material with a convex lower surface and a concave upper surface is positioned on the forming surface of a convex mold. FIG. 13 is an enlarged schematic diagram of the state of contact between the support member and the lateral surface of the glass material before and after softening.

First, at the start of forming, a glass material is positioned on the forming surface of the mold in a state supported by the support member. As shown in FIG. 13(a), the support provided by the support member is desirably provided with the lower portion of the lateral surface of the glass material being separated from the support member, and at least a portion of the upper edge portion of the lateral surface of the glass material being supported by the support member. Here, for example, the upper edge portion of the lateral surface of the glass material refers to the upper ⅘, preferably the upper ½, of the lateral surface of the glass material, and the lower portion of the lateral surface of the glass material refers to the portion positioned lower than the portion that is supported by the support member in the manner set forth above.

Further, at the start of forming, as shown in FIG. 2(a), the glass material is positioned on the forming surface of the mold so that the lower surface rim portion of the glass material is in tight contact with the forming surface and the lower surface center portion of the glass material is separated from the forming surface. Here, the lower surface center portion of the glass material refers to a position from the center of the forming surface to about ½ the radius, preferably a position from the center of the forming surface to a radius of 50 mm. The lower surface rim portion of the glass material that is in tight contact with the forming surface is a portion that is positioned away from the lower surface center portion of the glass material. At the start of forming, only the lower surface rim portion of the glass material is in contact with the forming surface of the mold. The lower surface of the glass material positioned and the forming surface are separated over the entire area inside the rim portion moving toward the geometric center of the glass material.

When the glass material is heat-softened with just the lower surface rim portion in contact with the forming surface of the mold in this manner, the center portion of the softening glass material deforms vertically under its own weight as it is heated. As shown in FIG. 2(b), the center portion of the lower surface comes into contact with the forming surface. This change in shape of the lower surface causes the upper surface of the glass material to undergo minute contraction and change shape. In the present invention, since the glass material is supported by the support member only at the upper edge portion of the lateral surface, this contraction of the upper surface of the glass material eliminates the contact between the glass material and the support member. As shown in FIG. 13(b), the support member then separates from the glass material. Additionally, since the rim portion of the glass material has been in a state of contact with the forming surface since the start of forming, inhibiting enlargement due to thermal expansion, a state of non-contact can be maintained between the lower portion of the lateral surface of the glass material and the support member. In this manner, at least when the entire lower surface of the glass material is in tight contact with the forming surface of the mold, the glass material can be in a state of separation from the support member. Thus, highly precise forming becomes possible by positioning the glass material on the mold without fusion of the glass material with the support member to prevent shifting during heat-softening. Further, since the lower portion of the lateral surface of the glass material does not come into contact with the support member during forming, the generation of distortion and the like by pressure due to differences in thermal expansion can be prevented.

By providing support in the manner set forth above, since contact between the glass material and the support member is eliminated as the glass material changes shape (displacement of the center portion of the bottom surface of the glass material in the direction of contact with the forming surface, and the accompanying contraction of the upper surface of the glass material) due to heat-softening, there is no need to remove the support member to prevent fusion. Thus, forming can be conducted without removing the support member from the mold and without causing fusion of the glass material and the support member. In the above embodiment, it is desirable to maintain the support member in a secure state on the mold, at least until the upper edge portion of the lateral surface of the glass material separates from the support member, and further, until completion of forming of the upper surface of the glass material. This permits exact positioning and enhances forming precision.

The support member and the support provided by the support member will be described below in detail.

As stated above, the support member employed in the present invention desirably has a shape permitting the support of at least a portion of the upper edge portion of the lateral surface of the glass material while maintaining a state of non-contact with the lower portion of the lateral surface of the glass material. An example of such a support member is an annular member that is circular in shape along the edge surface of the circumference of the glass material, with space in the portion over which the glass material is positioned, as shown by the cross-sectional view provided in FIG. 14. The top view of the annular member shown in FIG. 1 is shown in FIG. 14(a) and the cross-sectional view along section line I-I in FIG. 14(a) is shown in FIG. 14(b).

It suffices for the above support member to support at least a portion of an upper edge portion of the lateral surface of the glass material. However, to stably support the glass material, it is desirable for the glass material to be supported through contact with at least three points on the upper edge portion of the lateral surface of the glass material, and it is preferable for the glass material to be supported through contact with the entire circumference of the upper edge portion of the lateral surface of the glass material. For example, the annular member shown in FIG. 2, as shown in FIG. 13, has a protruding part 1101 and an edge surface 1102 on the inner circumference. Protruding part 1101 can contact the upper edge portion of the lateral surface of the glass material to support the glass material. Edge surface 1102 faces, but does not contact, the lateral surface of the glass member. The protruding part does not necessarily have to run around the entire inner circumference of the support member, but may be provided partially. For example, three or more protruding parts may be arranged on the inner circumference of the support member, preferably at equal angles. However, it is desirable for the protruding part to be in the form of a ring running completely around the inner circumference of the support member so as to provide reliable positioning and support.

The shape of protruding part 1101 can be determined in consideration of the shape and dimensions of the glass material being positioned and supported. For example, when protruding part 1101 is formed completely around the inner circumference of the support member and the glass material 60 to 90 mm in outer diameter is employed, the inner diameter of protruding part 1101 can be set within a tolerance range of −0 to +0.05 mm in the external shape of the glass material, based on the outer diameter of a glass material. The width (d in FIG. 13) of the contact portion of protruding part 1101 with the upper edge portion of the lateral surface of the glass material is desirably adequate to support the glass material and separate after softening. For example, when the width (D in FIG. 13) of the lateral surface of the glass material is 3 to 20 mm, it is desirable about 10 to 20 percent of D. The upper rim portion of protruding part 1101 is desirably positioned so as to contact the upper rim edge portion of the glass material.

As shown in FIGS. 2 and 13, the support member can be positioned by fitting into the top of the rim of the mold. The shape of the edge surface 1105 fitting into the mold is desirably set to match the shape of the mold. For example, when employing a glass material with the above-stated outer diameter, a tolerance of +0.1 to 0.2 mm can be set based on the outer diameter of the mold. Further, a step mount portion can be provided on the lateral surface of the mold and fitted into the bottom surface of the circumference of the support member to more stably support the support member.

When employing a covering member such as that set forth above, as shown in FIG. 13, for example, the edge surface 1103 in the step portion of the circumference of the glass material and the opening of the dust protective lid are fitted together to position the dust protective lid. The width of the edge surface 1103 may have an adequate area relative to the opening of the dust protective lid; for example, about 6 to 8 mm may be employed. The surface of edge surface 1103 can be mirror processed to enhance the tightness of the fit into the dust protective lid.

The above support member supports at least a portion of the upper edge portion of the lateral surface of the glass material positioned on protruding member 1101 provided on the inner circumference part, preferably supports the entire circumference of the upper edge portion of the lateral surface of the glass material, and positions the glass material at a desired location on the forming surface of the mold. For example, this desired location may be a position in which the geometric center of the forming surface of the mold conforms to the optical center or geometric center of the glass material.

The above support member is desirably made of a heat-resistant material. Heat resistant stainless steel is desirable as the heat-resistant material; an austenite-based material is suitable, for example. Austenite-based stainless steel materials have compositions containing C, Si, Mn, P, S, Ni, Cr, and Mo. The proportion (mass percentage) of the chemical components contained is, for example, equal to or less than 0.08 percent of C, equal to or less than 1.50 percent of Si, equal to or less than 2.00 percent of Mn, equal to or less than 0.045 percent of P, equal to or less than 0.030 percent of S, 19.00 to 22.00 percent of Ni, and 24.00 to 26.00 percent of Cr. Specifically, high-chrome, high-nickel based SUS310S can be employed.

Form processing of the support member can be conducted with a machining center or an NC milling disk. An oxide film is desirably formed to enhance durability on the surface of the support member. The surface treatment used to form the film may be electropolishing, electrostatic coating, or the like.

In the present invention, a mold having through-holes running from the forming surface to the opposite surface from the forming surface is desirably employed, and suction is desirably applied through the through-holes during molding. By providing through-holes in the forming surface and applying suction in this manner, the time required for deformation of the glass material can be shortened and productivity can be enhanced. As shown in the enlarged schematic drawings of FIG. 4, when employing a mold having irregularities, space remains between the forming surface and the glass material as shown in FIG. 4(b), even after heat-softening to bring the forming surface into tight contact with the lower surface of the glass material. The formation of this space has the effect of preventing the fusion, as mentioned above. On the other hand, air remains in this space and air pockets are formed. When these air pockets remain between the forming surface and the glass material, the air is sometimes trapped without being discharged. However, these air pockets create space between the forming surface and the glass material, creating the risk of impeding shape control of the glass material by the forming surface when the glass material comes into contact with the forming surface. Accordingly, when employing a mold having a forming surface of prescribed roughness as set forth above, it is desirable that through-holes are provided in the forming surface and aspiration is conducted to remove the air pockets.

When conducting aspiration while employing a covering member as set forth above, the pulse of the suction pump sometimes becomes nonuniform when the seal created by the covering member is excessively tight. Further, when aspiration is conducted up to the limit aspiration force of the suction pump, suction through the through-holes sometimes ceases. Accordingly, when providing through-holes in the forming surface and conducting aspiration, it is desirable to employ a covering member with a prescribed degree of permeability to air so as to control the flow rate during aspiration and even out the pulse of the suction pump. When a covering member having a prescribed degree of permeability to air is employed, the generation of a certain degree of negative pressure within the covering member causes an inflow of air from the exterior, making it possible to prevent the cessation of suction due to extreme negative pressure within the covering member. The air that flows into the interior of the covering member from the exterior is filtered by the covering member, preventing contamination by foreign matter such as dust and debris and preventing cleanliness issues.

To ensure a prescribed permeability to air in this manner, the covering member is desirably comprised of a porous material. The porosity is desirably 5 to 80 percent, preferably 30 to 40 percent, for example. When conducting processing to prevent particle scattering as set forth above, just the upper surface on the inside of the covering member can be treated to maintain the permeability to air of the lateral surface.

When manufacturing a casting mold, or a portion of a casting mold, for eyeglass lenses by the present invention and employing a mold having through-holes, the openings of the through-holes on the forming surface side are desirably arranged so as not to overlap with positions corresponding to refractive index measuring parts in the eyeglass lens on the lower surface of the glass material when the forming surface of the mold and the lower surface of the glass material are in tight contact.

Specifically, the above casting mold can be employed when manufacturing eyeglass lenses by mounting two casting molds on an annular gasket and pouring lens starting material solution into a cavity formed by the casting molds and the gasket to conduct polymerization. The mold employed in this method is generally designed according to the procedures comprising determining the surface shape of an eyeglass lens (design value determination), then converting the design values for the eyeglass lens into a casting mold surface shape (determination of casting mold design values) and then converting the casting mold design values into the surface shape of a mold. Each of these conversions may be conducted by a known method, and is desirably conducted by the surface shape determining method of the present invention described above. The shape of the surface positioned in the cavity of the casting mold that is manufactured using the mold having the surface shape thus determined is transferred to the eyeglass lens, making it possible to form optically functional surfaces. However, when unintended deformation occurs in the casting mold being formed due to suction through the through-holes, an optically functional surface with a shape differing from that of the design values ends up being formed. The position in an eyeglass lens having the greatest effect on optical characteristics is the reference point for measurement of the dioptric power. When there is a significant shift in the surface shape of this portion from the design values, it becomes difficult to obtain an eyeglass lens of desired refractive index. Accordingly, to prevent the above-described deformation at spots in the casting mold surface that are transferred to positions in the eyeglass lens at which reference points for measurement of dioptric power are formed, it is desirable to arrange the openings of through-holes on the forming surface of the mold so that they do not overlap positions corresponding to reference points for measurement of dioptric power on the eyeglass lens on the lower surface of the glass material when the forming surface and the lower surface of the glass material are in tight contact. Thus, it is possible to obtain a casting mold (or a portion thereof) for eyeglass lenses free of deformation caused by suction at positions corresponding to reference points for measurement of dioptric power, and the casting mold can be employed to obtain high-quality eyeglass lenses having desired optical characteristics.

The arrangement of the above through-holes will be described below.

The number of the through-holes may be one, but a plurality of through-holes is desirably provided. The number of through-holes formed in the mold is not specifically limited and may be suitably determined. When the forming surface has a diameter of about 80 to 100 mm, for example, about 6 to 60 through-hole openings may be arranged on the forming surface. As shown in FIG. 5(a), a plurality of through-holes may be arranged evenly at equal intervals over the entire forming surface. However, the through-holes are desirably provided so that the positions corresponding to reference points for measurement of dioptric power of the eyeglass lens on the lower surface of the glass material do not overlap the openings on the forming surface side when the forming surface and the lower surface of the glass material are brought into tight contact, as set forth above.

The through-holes in the mold are desirably arranged at least in the rim portion of the forming surface, it being preferable for plural through-holes to be positioned within a range smaller than the outer diameter of the glass material on at least two concentric circles.

Here, the term, rim portion of the forming surface means the portion surrounding the center portion of the forming surface. The term, center portion of the forming surface means, for example, a position from the center of the forming surface to about ½ the radius.

FIGS. 5(b) and (c) are examples of through-holes that have been arranged in the rim portion of the forming surface but not in the vicinity of the geometric center of the forming surface of the mold. In these cases, as well, it is desirable for the through-holes to be provided so that the positions corresponding to reference points for measurement of dioptric power in the eyeglass lens on the lower surface of the glass material do not overlap the openings on the forming surface side when the forming surface and the lower surface of the glass material are in tight contact. Further, in FIG. 5(b), the through-holes in the rim portion are arranged at equal intervals on plural concentric circles. The number of through-holes positioned per unit area is small at positions near the center, with the number of through-holes per unit area increasing with the distance from the center. That is, the through-holes are arranged in a manner increasing from the center portion toward the rim portion (with few through-holes near the center and numerous through-holes in the rim portion). As the result of research conducted by the present inventors, the arranging of through-holes in this manner, particularly when employing a glass substance as the glass material, can ensure reliable transfer properties. In addition, the present inventors discovered that heat-softening deformation could be conducted uniformly over the entire surface and that distortion within the glass material could be suppressed. The reasons for this are not yet fully known, but are presumed to be as follows.

Properties exist whereby the rate of deformation of glass materials and the tendency for such deformation to take place are greatest in the center, while the rate of deformation is relatively low and deformation tends not to occur in the perimeter portion. As shown in FIG. 3, when the lower surface of the glass material is convex and the forming surface of the mold is concave, the support portion of the glass material is the edge portion of the circumference of the glass material. In this case, the perimeter edge portion of the glass material that is supported by the forming surface tends not to move even during heat-softening, acting as an inhibiting factor on deformation caused by softening along the perimeter edge portion. The circumference portion is thought to undergo a low rate of deformation and to tend not to undergo shape deformation. However, there is no support portion in the center, so there is no factor inhibiting deformation caused by softening. The present inventors discovered that actual deformation of a glass material starts in the center portion, spreading sequentially to the perimeter portion.

However, the difference between the rate of deformation in the rim portion and in the center portion of the glass material sometimes becomes a distortion generating factor within the glass material. This is because when the center portion of the glass material deforms first by heat-softening, and deformation does not occur in the rim portion, distortion develops between the center portion and the rim portion of the glass material. The facts that the rate of deformation in the perimeter portion is low and that deformation tends not to occur there also become factors that reduce transfer precision. Accordingly, numerous through-holes are arranged in the rim portion of the forming surface of the mold, the distribution of the suction force is increased in the rim portion, where deformation tends not to occur, and few through-holes are arranged in the center portion, which tends to undergo deformation, to suitably distribute the suction force per unit area. This is thought to ensure reliable transfer properties, allow heat-softening deformation to take place uniformly over the entire surface, and prevent distortion within the glass material. In this manner, it is possible to control the difference in the rate of deformation and in the tendency to deform due to location in the glass material by the arrangement of the through-holes, enhancing the transfer reproducibility of the glass shape. Aspiration through the through-holes, as stated above, affords the advantages of shortening the deformation time of the glass material and increasing productivity.

The arrangement of the through-holes can be suitably selected for each material to be formed. For example, FIG. 5(b) is suitable in the case of a relative large curve, such as when the shape to be processed is a curve with a mean curvature of equal to or greater than 8, and FIG. 5(c) is suitable in the case of a relatively small curve, such as a curve with a mean curvature of equal to or less than 5. Further, as shown in FIG. 5(a), arranging the through-holes evenly over the entire surface is suitable for shapes with free-form surfaces, such as progressive dioptric power lenses.

To conduct high-precision forming while conducting aspiration through through-holes, it is desirable for the diameter of the through-holes, the viscosity of the glass material during aspiration, the thickness of the glass material, and the suction pressure to satisfy Equation 1 below. In particular, as set forth above, when employing a mold with a highly rough forming surface and conducting an excessive level of aspiration through the through-holes, there is a risk that the surface roughness of the forming surface and the shape of the through-holes affect the shape of the upper surface of the glass material. Thus, it is desirable to satisfy Equation 1 when conducting aspiration. It is also desirable to conduct aspiration under conditions satisfying Equation 1 to even out pulse of the suction pump and employ a covering member having a suitable degree of permeability to air, as set forth above.

Equation 1

$$H = K\frac{(V) \times (T)^2}{(P)} \qquad \text{[Numeral 3]}$$

Specifically, Equation 1 may be expressed as Equation 1-1 below.

Equation 1-1

$$H = \frac{2.0 \times 10^{-8}(V) \times 10^2(T)^2}{36(P)} \qquad \text{[Equ. 4]}$$

In the above equations, H denotes the diameter (mm) of the through-holes, V denotes the viscosity (poise) of the glass material during aspiration, T denotes the thickness (mm) of the glass material, and P denotes the aspiration pressure (mmHg/cm$^2$), where 1 poise=0.1 Pa·s. K denotes a coefficient; 1.8 to 3.0×10$^{-9}$ is suitable.

Specifically the diameter of the through-holes can be 0.3 to 0.5 mm, the viscosity of the glass material during aspiration can be 6.81×10$^{+7}$ to 1.26×10$^{+8}$ poise, the thickness of the glass material can be 4 to 7 mm, and the aspiration pressure can be 80 to 120 mmHg/cm$^2$ ($\approx$1.0×10$^4$ to 1.6×10$^4$ Pa/cm$^2$).

The thickness of the glass material can be assumed identical during forming. In Equation 1 above, the thickness of the glass material is the thickness at the start of forming. In the present invention, based on Equation 1 above, the temperature of the glass material during heat-softening can be monitored with a thermocouple or the like, the viscosity of the glass material can be calculated, and the aspiration pressure can be set. The aspiration pressure can also be set based on the relation between the temperature and the viscosity, the latter being calculated from the viscosity characteristics of the glass material employed.

The aspiration method will be described below based on FIG. 6. FIG. 6 is a drawing of an example of the aspiration method. However, the present invention is not limited to the embodiment shown in FIG. 6.

As shown in FIG. 6, mold 402, on which has been positioned a glass material, is placed on aspiration base 403. Aspiration is conducted by aspiration base 403 and suction pump part 404. Aspiration base 403 is a platelike hollow base in which the spots where molds are positioned is hollowed in a concave shape. It is made of a material such as heat-resistant stainless steel (SUS310S). Air inlets 407 are positioned at the spots where molds are positioned on the upper surface of the aspiration base. Discharge outlets for feeding aspirated air to the suction pump are located on the lower surface of the aspiration base and connected to suction terminal 405 that is linked to the suction pump. The suction pressure is desirably set to satisfy Equation 1 above; for example, it can be set to 80 to 120 mmHg ($\approx 1.0 \times 10^4$ to $1.6 \times 10^4$ Pa).

A specific embodiment of the method of manufacturing a formed article of the present invention will be described below. However, the present invention is not limited to the embodiment described below.

First, preferably in a clean room, a mold is positioned with the forming surface on top. When employing a support member in the manner set forth above, the support member is fitted into the rim portion of the forming surface and the step mount member of the lateral surface. The glass material is then placed in a prescribed position on the forming surface along the support member. The edge surface of the lateral portion of the glass material is securely supported horizontally by the support member. The edge surface of the rim portion of the lower surface of the glass material contacts the forming surface of the mold in a vertical direction, and is securely supported. The center portion on the side of the contact surface of the glass material with the mold is separated from the forming surface of the mold. The separation distance varies with the shape of the forming surface of the mold and the lower surface of the forming surface material, but is normally about 0.1 to 2.0 mm.

Next, the lid member is desirably fitted into the support member and placed. After covering the exposed portion at the top of the mold on which the glass material has been positioned with the lid member, they are sent from the clean room to an electric furnace. The assembly of the mold, support member, glass material, and lid member is placed on the aspiration base of the electric furnace and heat treated with the electric furnace and suction treatment is conducted with a suction device. To reliably prevent contamination by foreign matter, the positioning of the glass material on the mold and the like is desirably conducted in a clean room in this manner.

In the electric furnace, a heat-softening treatment can be conducted while effecting temperature controls based on a preset temperature program. Either a batch-type electric furnace or a continuous feed-type electric furnace may be employed as the electric furnace. The description of a batch-type electric furnace will be given first.

A batch-type electric furnace is a device in which a piece to be processed is placed in a relatively small, confined space and the temperature within the furnace is varied according to a predetermined temperature program. It is equipped with plural sensors. The temperature is measured by the plural sensors, and each heater can be controlled to manage the temperature. In a batch-type heat-softening furnace, there is a support part holding the piece to be processed. Furthermore, the support part can move within the furnace. Imbalances in temperature distribution due to location within the furnace can be equalized by operating the support part.

A continuous feed-type electric furnace will be described next. A continuous feed-type electric furnace is a device having an entrance and an exit, in which pieces to be processed are heat treated by being passed through the interior of an electric furnace of set temperature distribution over a certain period by a conveying device such as a conveyor. In a continuous feed-type electric furnace, plural heaters designed to generate and release heat and an internal air circulation control structure can maintain a uniform heat distribution within the furnace.

PID controls can be employed in temperature control by each sensor and heater of the electric furnace. PID controls are a control method for detecting deviation between a programmed target temperature and the actual temperature and restoring (feedback) the deviation from the target temperature to 0. PID controls are a method of obtaining an output in "Proportional", "Integral", "Differential" manner when calculating from the deviation. The general equation of PID controls is given below.

General equation of PID controls: [Numeral 4]

$$y = K_P \left( e + K_I \int e \, dt + K_D \frac{d}{dt} e \right)$$

P term:
$$K_P \cdot e_n$$

I term:
$$\int e \, dt = \lim_{\Delta t \to 0} \left( \sum_{i=0}^{n} e_i \Delta t \right) = \Delta t \sum e_n$$

D term:
$$\frac{d}{dt} e = \lim_{\Delta t \to 0} \left( \frac{\Delta e}{\Delta t} \right)$$
$$\Delta e = e_n - e_{n-1}$$

as
$$\frac{1}{\Delta t}(e_n - e_{n-1})$$

Thus:
$$y = K_P \left[ \begin{array}{l} e_n + K_I \Delta t \sum e_n + \\ \dfrac{K_D}{\Delta t}(e_n - e_{n-1}) \end{array} \right]$$

In the above equations, e denotes deviation, K denotes gain (the gain with the subscript P denotes proportional gain, the gain with the subscript I denotes integral gain, and the gain with the subscript D denotes differential gain), $\varDelta$(DELTA)t denotes the sample time (sampling time, control frequency), and subscript n denotes the current time.

Using PID controls makes it possible to increase the precision with which the temperature is controlled within the furnace for changes in the heat quantity distribution based on the shape and quantity of inputted pieces to be processed. A nonsliding system (for example, a walking beam) can be adopted for conveyance within the electric furnace.

In the specific embodiment of a continuous feed-type electric furnace that can be used in the present invention, the conveyance system is a nonsliding system, the temperature controls are PID temperature controls, the temperature measurement device is "K thermocouple 30 point made by Platina", a maximum use temperature is 800° C., the commonly employed temperature ranges from 590 to 650° C., the internal atmosphere is a dry air (free of oil and dust), the atmospheric control is in the form of an inlet air curtain, internal furnace purging, and an outlet air curtain, and the temperature control precision is ±3° C., and the cooling system is air cooling, and suction parts are at 3 positions within the furnace.

The temperature within the electric furnace can be increased from room temperature to higher than the glass transition point, but lower than the glass softening point, by heating and rising temperature. The temperature is desirably maintained lower than the glass softening point for a certain period, and then gradually reduced to room temperature.

The temperature is controlled within the electric furnace in a cycle of prescribed duration.

An example of temperature control in which an individual cycle lasts 17 hours and a glass substance is employed as the glass material will be described below. However, the present invention is not limited to the embodiment described below.

Furnace temperature control can be conducted in seven steps. The first step (A) is a preheating step. The second step (B) is a rapid heating and temperature-rising step. The third step (C) is a slow heating and temperature-rising step. The fourth step (D) is a step in which a constant temperature is maintained. The fifth step (E) is a slow cooling step. The sixth step (F) is a rapid cooling step. And the seventh step (G) is a natural cooling step.

In the preheating step (A), which is the first step, a constant temperature close to room temperature is maintained for 90 minutes. This is done in order to establish a uniform temperature distribution throughout the glass material and to facilitate reproducibility of the thermal distribution of the glass material by temperature control during processing by heat-softening. The temperature that is maintained can be any temperature of about room temperature (about 20 to 30° C.).

In rapid heating step (B), which is the second step, heating is conducted for about 90 minutes by increasing the temperature from room temperature (for example, 25° C.) to a temperature 50° C. below (also called "T1" hereinafter) the glass transition temperature (also referred to as "Tg" hereinafter) at a rate of about 4° C./min, for example. Then, in slow heating step (C), which is the third step, heating is conducted for 120 minutes by increasing the temperature from temperature T1 to a temperature about 50° C. below the glass softening point (also called "T2" hereinafter) at a rate of 2° C./min, for example. In constant temperature maintenance step (D), which is the fourth step, temperature T2 is maintained for about 60 minutes.

The glass material that has been heated to temperature T2 is heated for about 30 minutes in the constant temperature maintaining step. Heating is then conducted for another 30 minutes at temperature T2. When a mold having through-holes as described above is employed, during these latter 30 minutes, suction processing can be conducted through the through-holes in the mold. The suction processing can be conducted by operating a suction pump positioned outside the electric furnace. As shown in FIG. 6, suction pump 404 are connected to suction terminal 405, aspiration base 403 and through-holes in the mold, respectively. When suction is conducted by the suction pump, a negative pressure is generated. The negative pressure passes through the through-holes in the mold, applying suction to the glass material positioned in the mold. The generation of a suction of 80 to 150 mmHg ($\approx 1.0 \times 10^4$ to $1.6 \times 10^4$ Pa) through a suction inlet of the prescribed heat-resistant base mold begins 30 minutes after the start of heating at temperature T2 in the electric furnace. First, suction pump 404 outside the furnace is operated, and negative pressure is generated through suction terminal 405 within the interior of the aspiration base, which has a hollow configuration. The aspiration base in which negative pressure has been generated is communicated to the through-holes on the bottom surface of the mold. The through-holes on the bottom surface of the mold penetrate to the forming surface at the top of the mold and conduct suction by applying the negative pressure by suction to the glass material positioned on the mold. As set forth above, the use of a lid member of prescribed permeability to air is desirable when conducting suction through the through-holes.

Once the suction has been completed, heat-softening deformation of the glass material onto the mold is concluded. Once deformation by heat-softening has been concluded, cooling is conducted. In slow cooling step (E), the fifth step, cooling is conducted, for example, for about 300 minutes at a rate of 1° C./min to a temperature 100° C. below Tg (also called "T3" hereinafter) to fix the change in shape caused by deformation. The slow cooling step also comprises annealing elements to remove glass distortion.

Next, in rapid cooling step (F), the sixth step, cooling is conducted to about 200° C. at a rate of about 1.5° C./min. There is a risk of the glass that has been processed by softening and the mold being damaged by their own thermal contraction and differences between each other in coefficients of thermal expansion to temperature change. Accordingly, the temperature change rate is preferably small to the extent that damage does not occur.

Further, when the temperature drops to equal to or lower than 200° C., rapid cooling step (G), the seventh step, is conducted. In rapid cooling step (G), natural cooling is conducted from 200° C. to room temperature.

Once softening processing has been completed, the lower surface of the glass material and the forming surface of the mold fit precisely together. The upper surface of the glass material deforms based on the shape deformation of the lower surface of the glass material, forming the desired optical surface. Once the glass optical surface has been formed in the above steps, the glass material is removed from the mold, yielding a formed article. The formed article thus obtained can be employed as a casting mold for eyeglass lenses (preferably multifocal eyeglass lenses). Alternatively, a portion such as the rim portion can be removed and then the formed article can be employed as a casting mold for eyeglass lenses.

Figure 1:
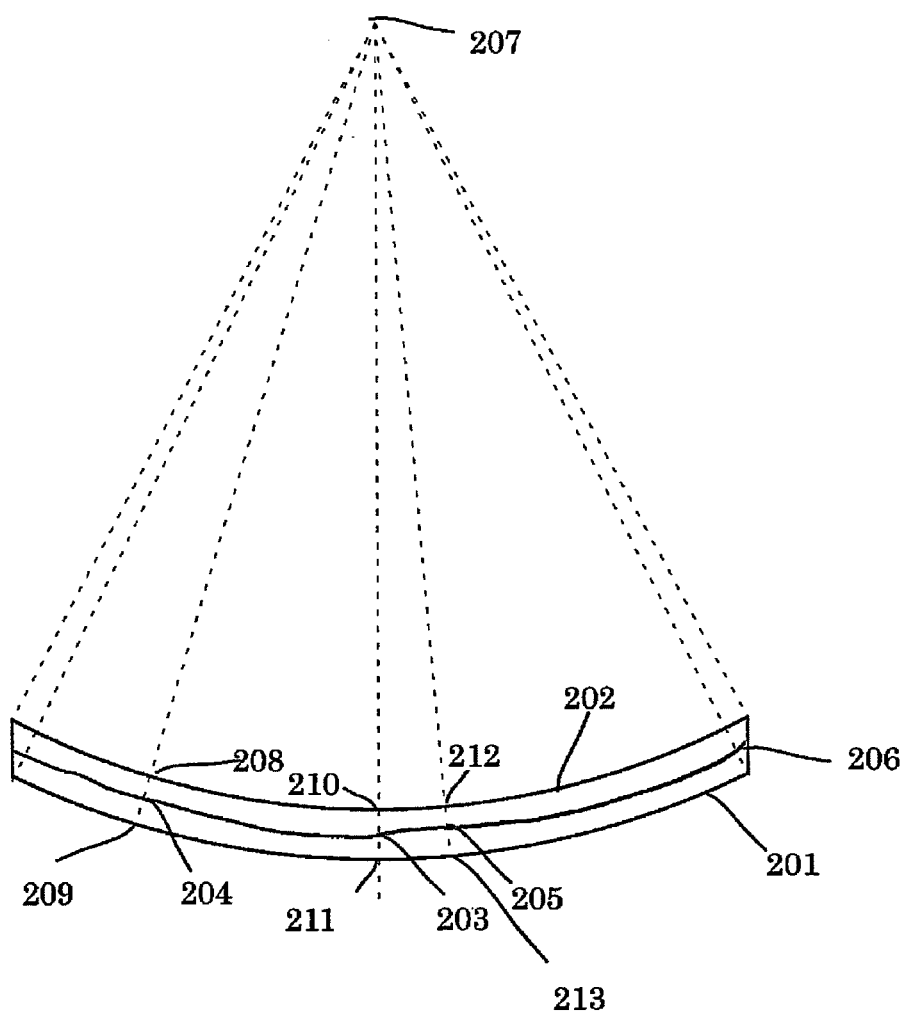
[FIG. 1] It shows an example (sectional view) of glass of essentially equal thickness in the normal direction.
Figure 2:
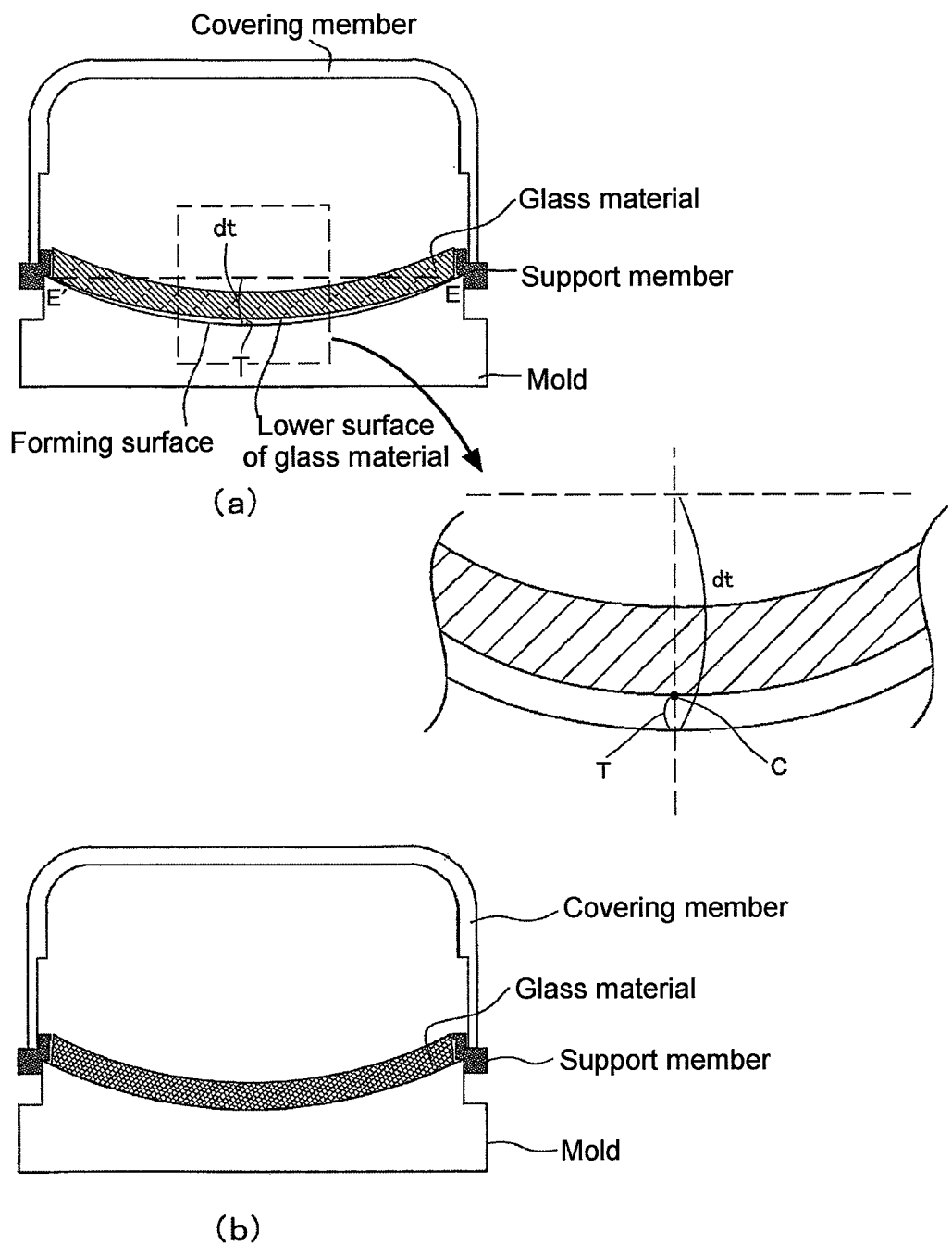
[FIG. 2] It shows a schematic diagram of the state of contact between the mold and the glass material before and after softening.
Figure 3:
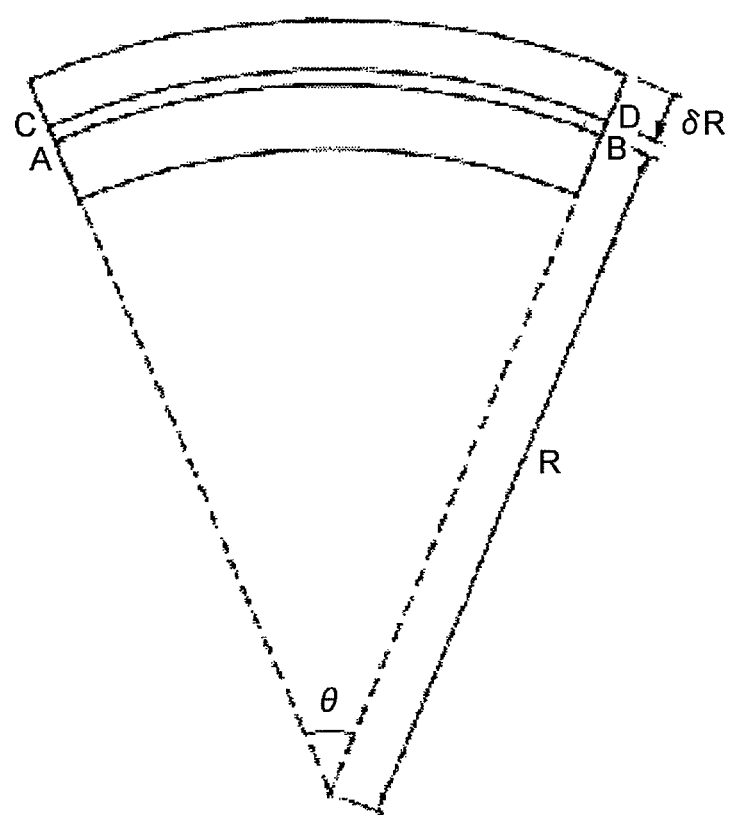
[FIG. 3] It is a drawing showing the deformation of a viscoelastic material in the form of plate glass.
Figure 4:
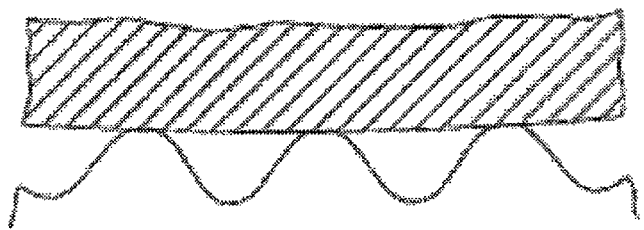
[FIG. 4] It shows an enlarged schematic diagram of the state of contact between the mold and the glass material before and after heat-softening in a mold having a forming surface of prescribed roughness.
Figure 4:
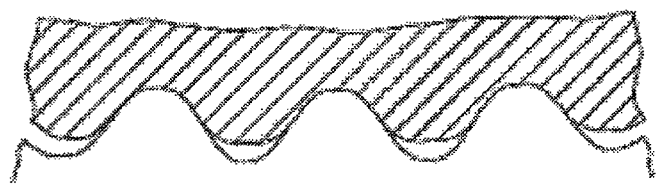
Figure 5:
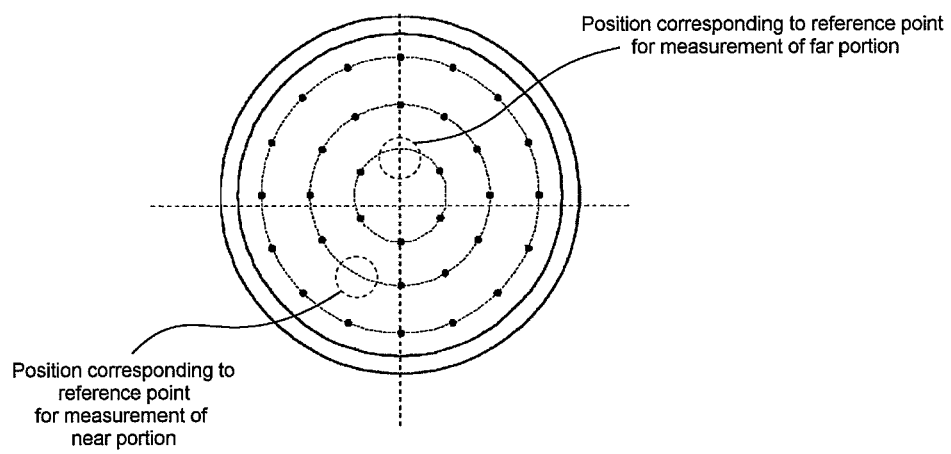
[FIG. 5] It shows a specific example of the arrangement of through-holes on the forming surface of a mold.
Figure 5:
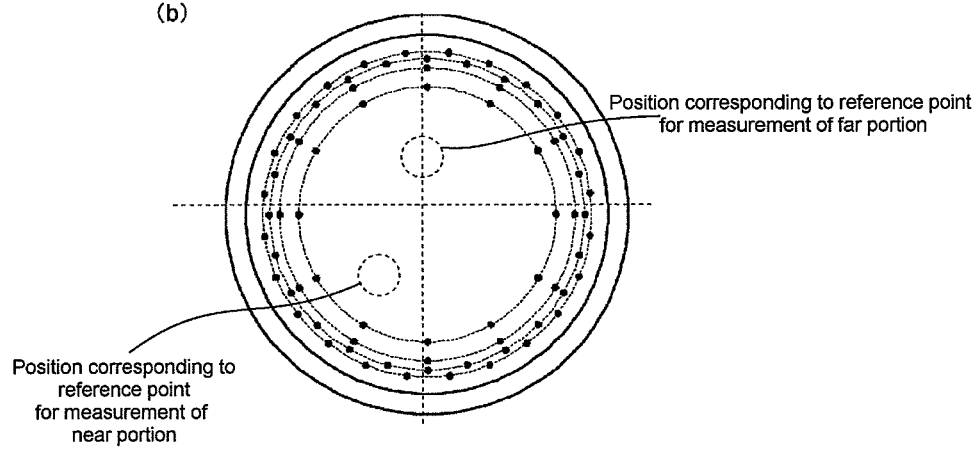
Figure 5:
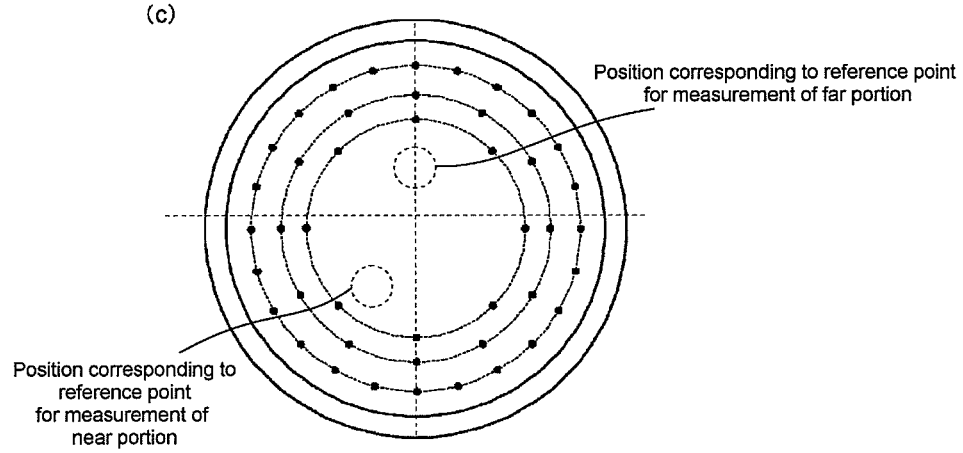
Figure 6:
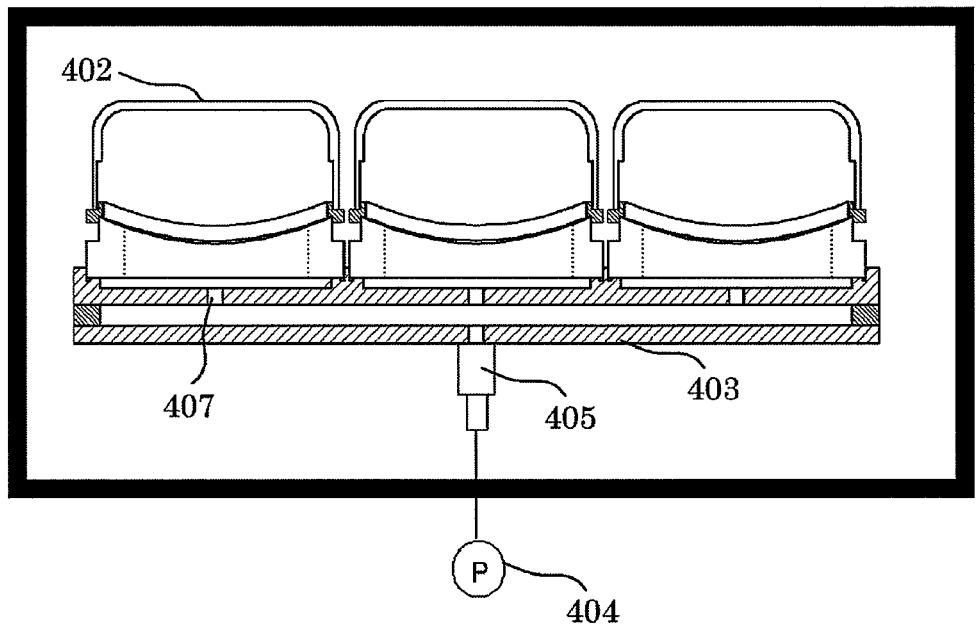
[FIG. 6] It is a drawing showing an example of the suction method.
Figure 7:
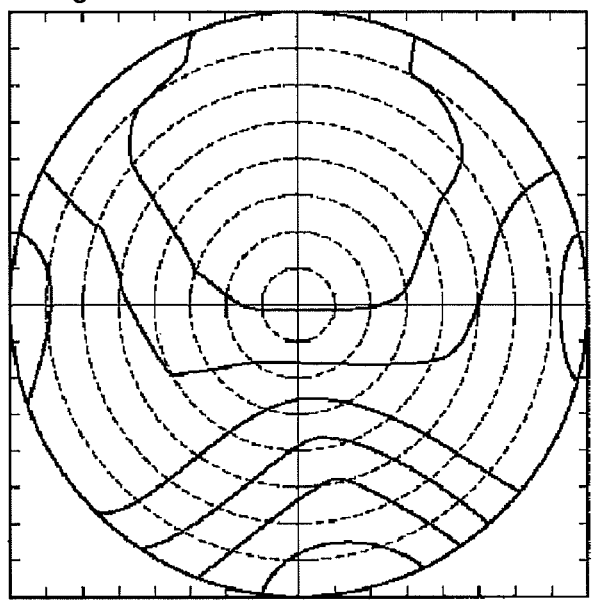
[FIG. 7] It is a distribution diagram of S degrees (average degrees) in a progressive multifocal lens.
Figure 8:
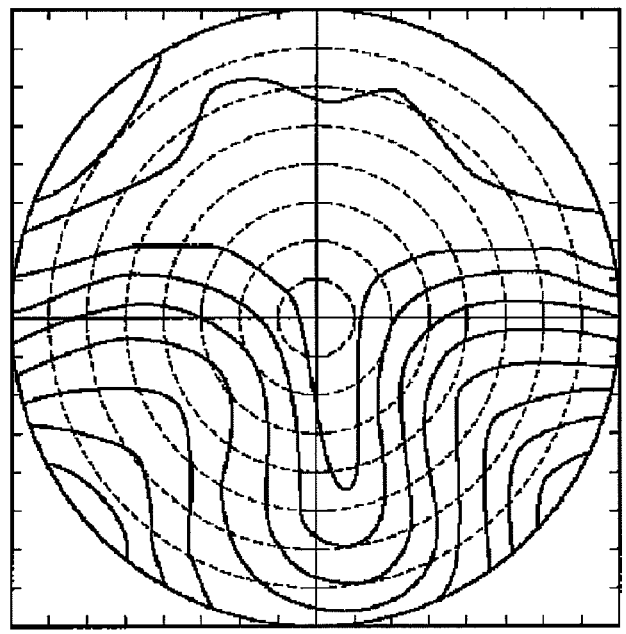
[FIG. 8] It is a distribution diagram of C degrees (cylinder degrees) in a progressive multifocal lens.
Figure 9:
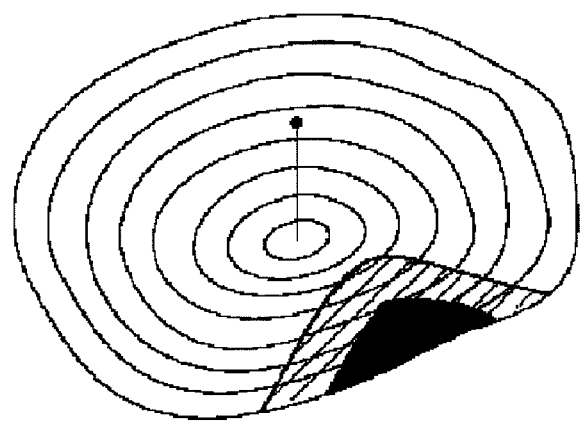
[FIG. 9] It is a top view corresponding to the S degree distribution in FIG. 7.
Figure 9:
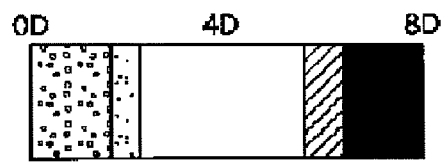
Figure 10:
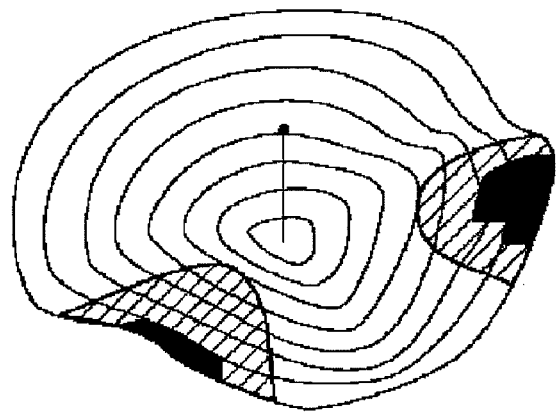
[FIG. 10] It is a top view corresponding to the C degree distribution in FIG. 8.
Figure 10:
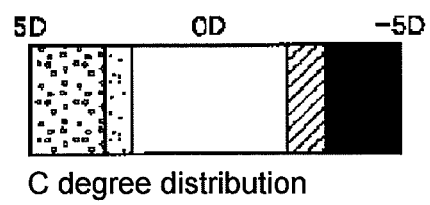
Figure 11A:
[FIG. 11a] It is a drawing showing the cross-section of a progressive dioptric power plastic lens.
Figure 11B:
FIG. 11b It is a drawing showing the cross-section of a center-symmetric aspherical dioptric power plastic lens.
Figure 11C:
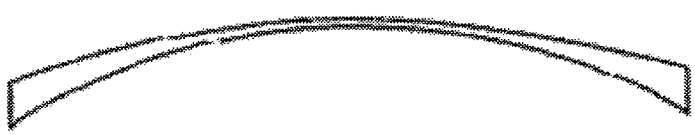
[FIG. 11c] It is a drawing showing the cross-section of a progressive dioptric power glass lens.
Figure 12:
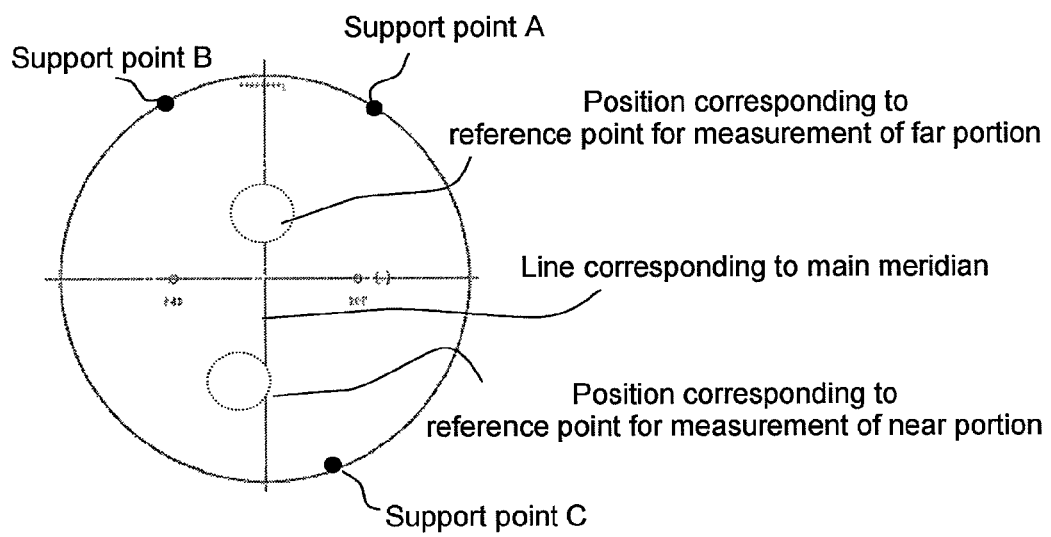
[FIG. 12] It is a drawing descriptive of contact between the lower surface of a formed material and the forming surface of a mold.
Figure 12:
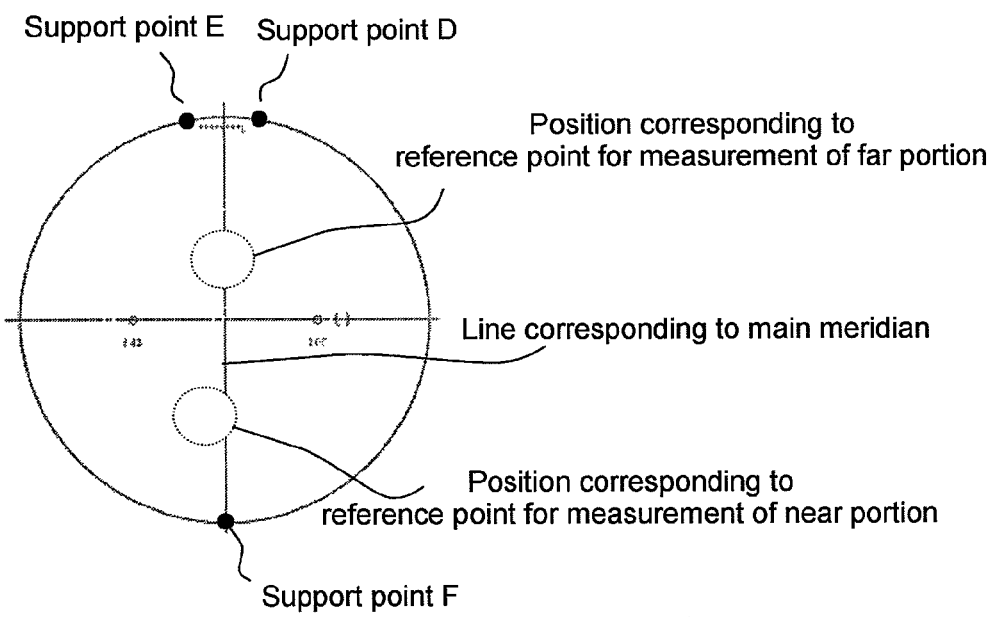
Figure 13:
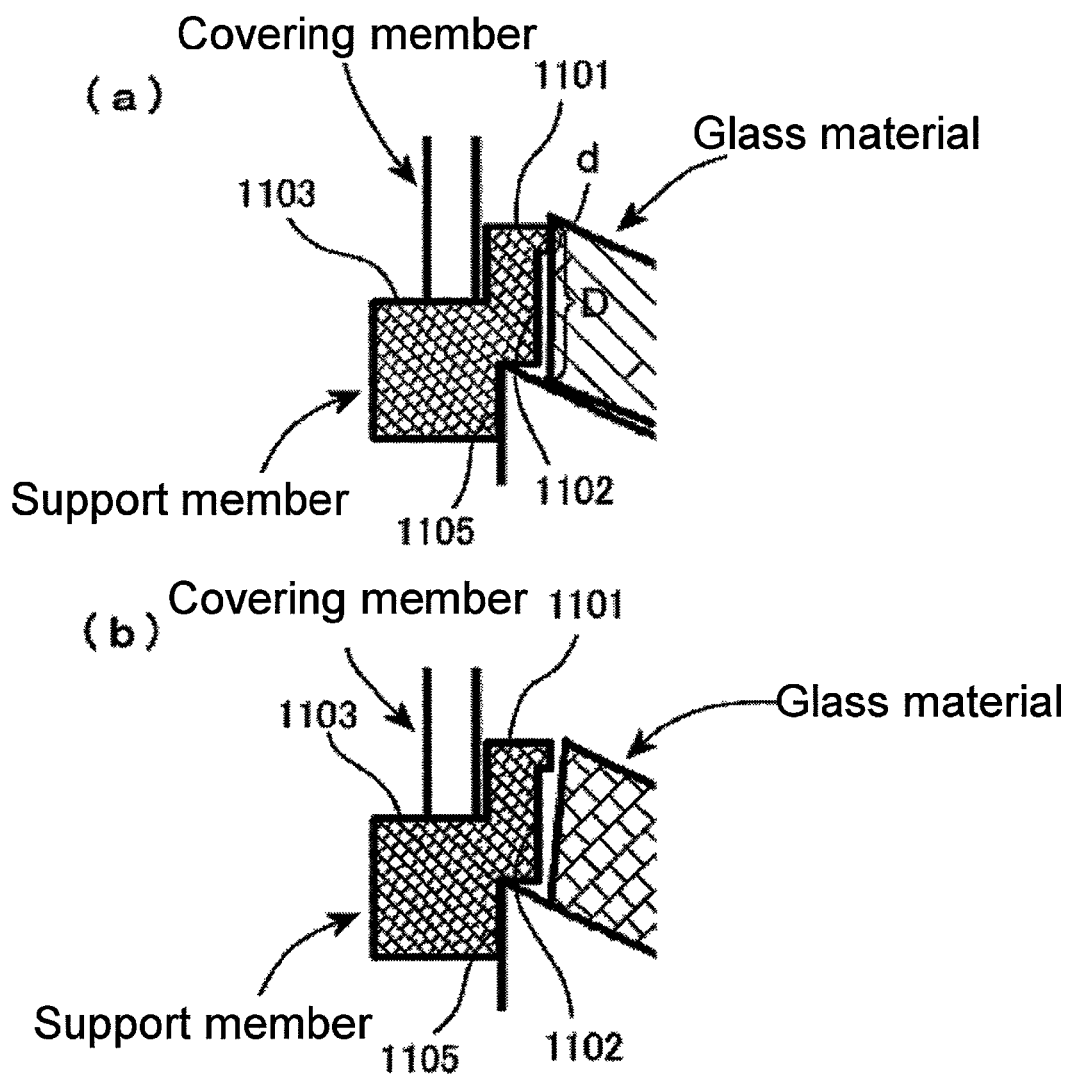
[FIG. 13] It is an enlarged schematic diagram of the state of contact between a support member and the lateral surface of a glass material before and after softening.
Figure 14:
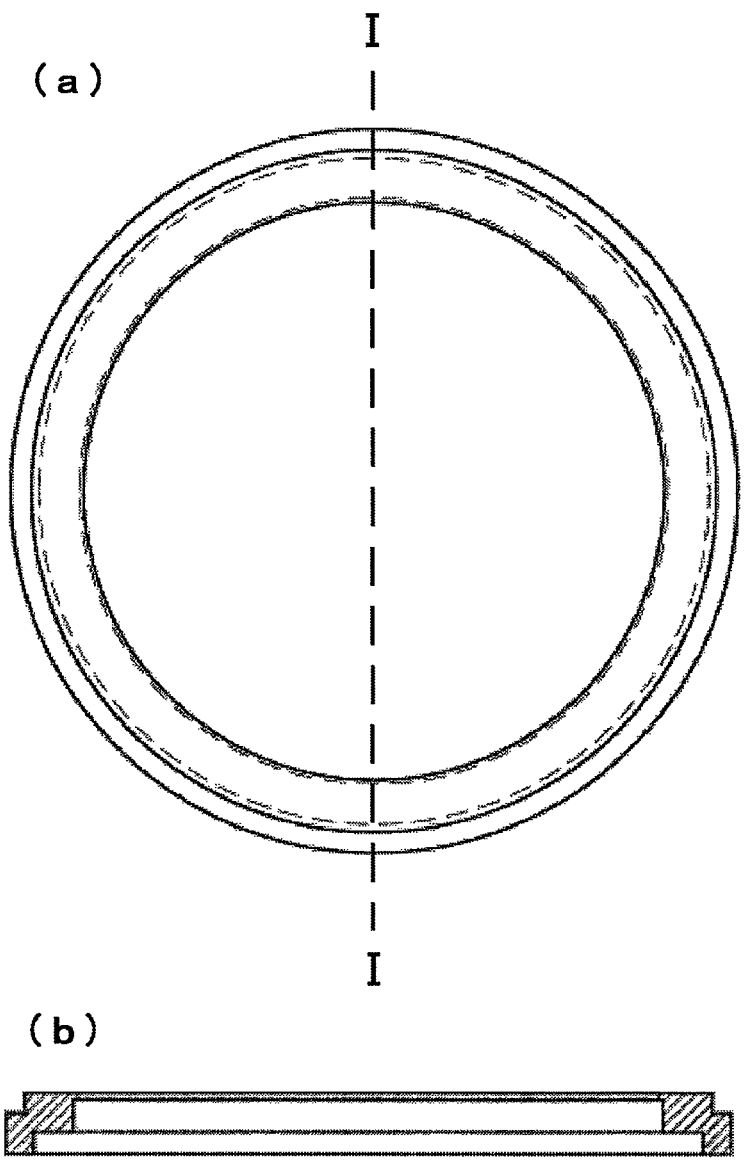
[FIG. 14] A top view of the annular member shown in FIG. 2 is shown in FIG. 14(*a*), and a sectional view along section line I-I in FIG. 14(*a*) is shown FIG. 14(*b*).

The invention claimed is:

1. A method of manufacturing a casting mold or a portion of a casting mold, wherein the casting mold or the portion of a casting mold is used in the manufacture of an eyeglass lens, and wherein the method comprises:
   providing a glass material of essentially equal thickness in a normal direction and having upper and lower surfaces that are spherical in shape, wherein the upper spherical surface has a smaller radius of curvature than the lower spherical surface, and the radii of curvature of the upper and lower spherical surfaces are constant over the entirety of the surfaces,
   providing a mold comprising a forming surface having a free-form shape other than spherical,
   positioning the glass material on the forming surface, and
   heating the glass material to a temperature permitting deformation to bring the lower surface of the glass material into tight contact with the forming surface, whereby the glass material is formed into the casting mold or the portion of a casting mold, which is used in the manufacture of an eyeglass lens,
   whereby the upper surface of the glass material is formed so that spacing between the upper surface of the glass material and the forming surface of the mold in the normal direction is approximately equal at all positions, and
   wherein the glass material has a thickness ranging from 2 to 10 mm in a normal direction.

2. The method of manufacturing according to claim 1, wherein the glass material has an outer diameter ranging from 60 to 90 mm.

3. The method of manufacturing according to claim 1, wherein the positioning of the glass material is conducted so that at least three points on the lower surface rim portion of the glass material are in contact with the forming surface and the lower surface center portion of the glass material is separated from the forming surface.

4. The method of manufacturing according to claim 3, wherein the casting mold or the portion of a casting mold is used in the manufacture of a progressive dioptric power lens having one reference point for measurement of far dioptric power and one reference point for measurement of near dioptric power, and
   the three points on the lower surface rim portion of the glass material are comprised of, on the lower surface rim portion of the glass material, two points that are positioned on a side corresponding to the reference point for measurement of far dioptric power of the progressive dioptric power lens and one point that is positioned on a side of the reference point for measurement of near dioptric power.

5. The method of manufacturing according to claim 4, wherein the two points that are positioned on a side corresponding to the reference point for measurement of far dioptric power are positioned symmetrically about a line on the lower surface of the glass material corresponding to a main meridian that runs through the reference point for measurement of far dioptric power of the progressive dioptric power lens.

6. The method of manufacturing according to claim 4, wherein the lower surface of the glass material has a spherical shape of which mean curvature is roughly identical to a mean curvature at the reference point for measurement of far dioptric power of the progressive dioptric power lens.

7. The method of manufacturing according to claim 1, wherein the casting mold or the portion of a casting mold is used in the manufacture of a single-vision eyeglass lens, and
   the positioning of the glass material is conducted so that the entire circumference of the lower surface rim portion of the glass material is in contact with the forming surface and the lower surface center portion of the glass material is separated from the forming surface.

8. The method of manufacturing a formed article according to claim 1, wherein the upper spherical surface and the lower spherical surface of the glass material share a single center.

9. A method of manufacturing an eyeglass lens comprising:
   manufacturing a first casting mold or a portion of a casting mold by the method according to claim 1, and
   manufacturing an eyeglass lens by cast polymerization with the first casting mold or the portion of a casting mold.

10. The method of manufacturing according to claim 9, wherein the eyeglass lens is manufactured by mounting second and third casting molds on an annular gasket and pouring a lens starting material solution into a cavity formed by the first and second casting molds and the gasket to conduct polymerization, wherein at least one of the second and third casting molds is the first casting mold or the portion of a casting mold.

11. The method of manufacturing according to claim 9, wherein the eyeglass lens is a single-vision eyeglass lens, multifocal eyeglass lens, or progressive dioptric power eyeglass lens.

12. The method of manufacturing according to claim 1, wherein the lower spherical surface of the glass material is a convex surface and the forming surface of the mold is a concave surface.

13. The method according to claim 1, wherein the glass material is heated from room temperature to a temperature that is above the glass transition point but is about 50° C. below the glass softening point during the heating step.

* * * * *